(12) United States Patent
Kunieda et al.

(10) Patent No.: US 10,708,446 B2
(45) Date of Patent: Jul. 7, 2020

(54) INFORMATION PROCESSING APPARATUS, CONTROL METHOD, AND STORAGE MEDIUM

(71) Applicant: CANON KABUSHIKI KAISHA, Tokyo (JP)

(72) Inventors: Hiroyasu Kunieda, Yokohama (JP); Shinjiro Hori, Yokohama (JP); Masaaki Obayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/144,793

(22) Filed: Sep. 27, 2018

(65) Prior Publication Data

US 2019/0104222 A1    Apr. 4, 2019

(30) Foreign Application Priority Data

Oct. 3, 2017  (JP) .................... 2017-193776

(51) Int. Cl.
*H04N 1/00*    (2006.01)

(52) U.S. Cl.
CPC ..... *H04N 1/00196* (2013.01); *H04N 1/00137* (2013.01); *H04N 1/00143* (2013.01); *H04N 1/00175* (2013.01); *H04N 1/00456* (2013.01)

(58) Field of Classification Search
CPC .......... H04N 1/00196; H04N 1/00143; H04N 1/00175; H04N 1/00137; H04N 1/00456; H04N 1/00167; H04N 1/387; H04N 1/393; H04N 1/3935; G06F 3/1208; G06F 3/1242; G06F 3/125
See application file for complete search history.

(56) References Cited

U.S. PATENT DOCUMENTS

2013/0294709 A1* 11/2013 Bogart ................. G06T 7/00
                                                    382/284
2017/0185843 A1*  6/2017 Goto .................. G06T 7/62

FOREIGN PATENT DOCUMENTS

JP        2013-30161 A    2/2013

* cited by examiner

*Primary Examiner* — Kent Yip
(74) *Attorney, Agent, or Firm* — Canon U.S.A., Inc. IP Division

(57) ABSTRACT

Based on pixel information of a target image selected from a plurality of images, an information processing apparatus specifies whether the target image is to be used for an album, and sets a template based on a condition for creating the album. The information processing apparatus places on the set template the target image to be used for the album according to the specifying.

10 Claims, 22 Drawing Sheets

FIG.5

| IMAGE ID | IMAGE CAPTURING DATE AND TIME | IMAGE TYPE | FOCUS | OBJECT CLASSIFICATION ||||||| NUMBER OF FACES | INDIVIDUAL ID |||||||||
|---|---|---|---|---|---|---|---|---|---|---|---|---|---|---|---|---|---|---|
| | | | | TOP1 || TOP2 || TOP3 || | 1 ||| 2 ||| 3 |||
| | | | | CATEGORY | RELIABILITY | CATEGORY | RELIABILITY | CATEGORY | RELIABILITY | | UPPER-LEFT POSITION | LOWER-RIGHT POSITION | | UPPER-LEFT POSITION | LOWER-RIGHT POSITION | | UPPER-LEFT POSITION | LOWER-RIGHT POSITION | |
| 1 | 2015/7/1 10h11m12s | STILL IMAGE | ○ | PERSON | 90 | — | — | — | — | 6 | 40, 40 | 65, 65 | 90, 40 | 115, 65 | 10, 20 | 25, 35 |
| 2 | 2015/7/1 10h12m36s | MOVING IMAGE | ○ | PERSON | 80 | ANIMAL | 40 | — | — | 2 | 50, 100 | 100, 150 | 150, 125 | 190, 165 | 150, 125 | 190, 165 |
| 3 | 2015/7/1 10h15m54s | SNS | ○ | ANIMAL | 70 | PERSON | 10 | FOOD | 5 | 0 | — | — | — | — | — | — |
| ... | ... | | ... | ... | ... | ... | ... | ... | ... | ... | ... | ... | ... | ... | ... | ... |

FIG.7

| SCENE | IMAGE CAPTURING PERIOD (HOURS) | | NUMBER OF CAPTURED IMAGES (IMAGES) | | NUMBER OF CAPTURED PEOPLE (PEOPLE) | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG.8A

| SCENE | IMAGE FEATURE OF MAIN SLOT | IMAGE FEATURE OF SUB SLOT |
|---|---|---|
| TRAVEL | LONG-SHOT IMAGE INCLUDING PERSON AND SCENERY | IMAGE OF CLOSE-UP OF FACE OR PROFILE |
| DAILY LIFE | IMAGE OF CLOSE-UP OF FACE OR PROFILE | LONG-SHOT IMAGE INCLUDING PERSON AND SCENERY |
| CEREMONY | IMAGE IN WHICH DISTANCE BETWEEN TWO PEOPLE IS SMALL | IMAGE OF LARGE NUMBER OF PEOPLE |

FIG.8B

| IMAGE ID | SCORE (OUT OF 50 POINTS) | |
|---|---|---|
| | MAIN SLOT (POINTS) | SUB SLOT (POINTS) |
| 1 | 20 | 40 |
| 2 | 45 | 10 |
| 3 | 10 | 20 |
| ... | ... | ... |

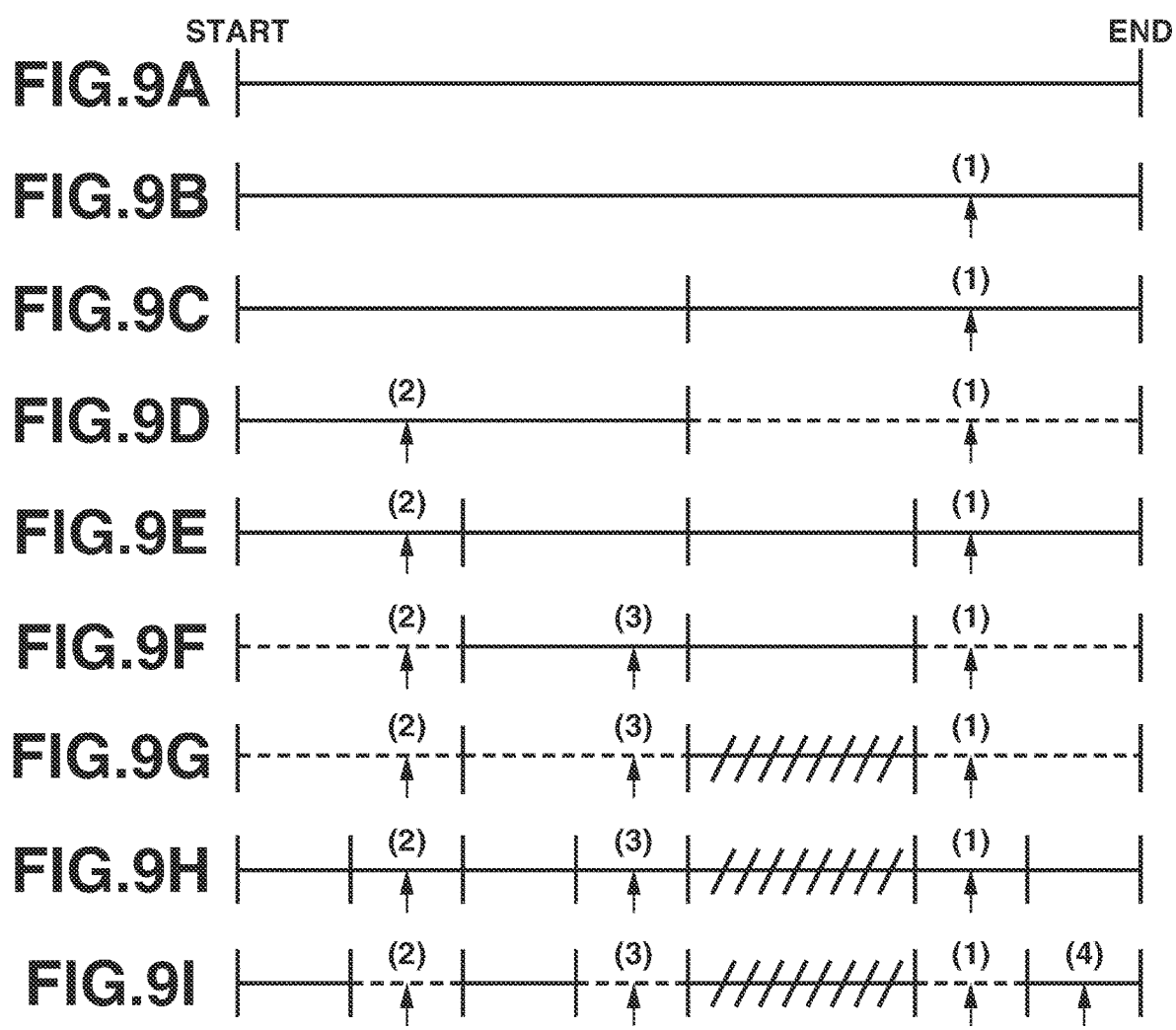

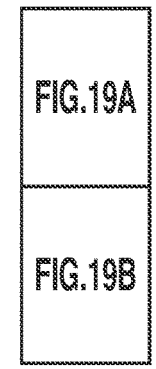
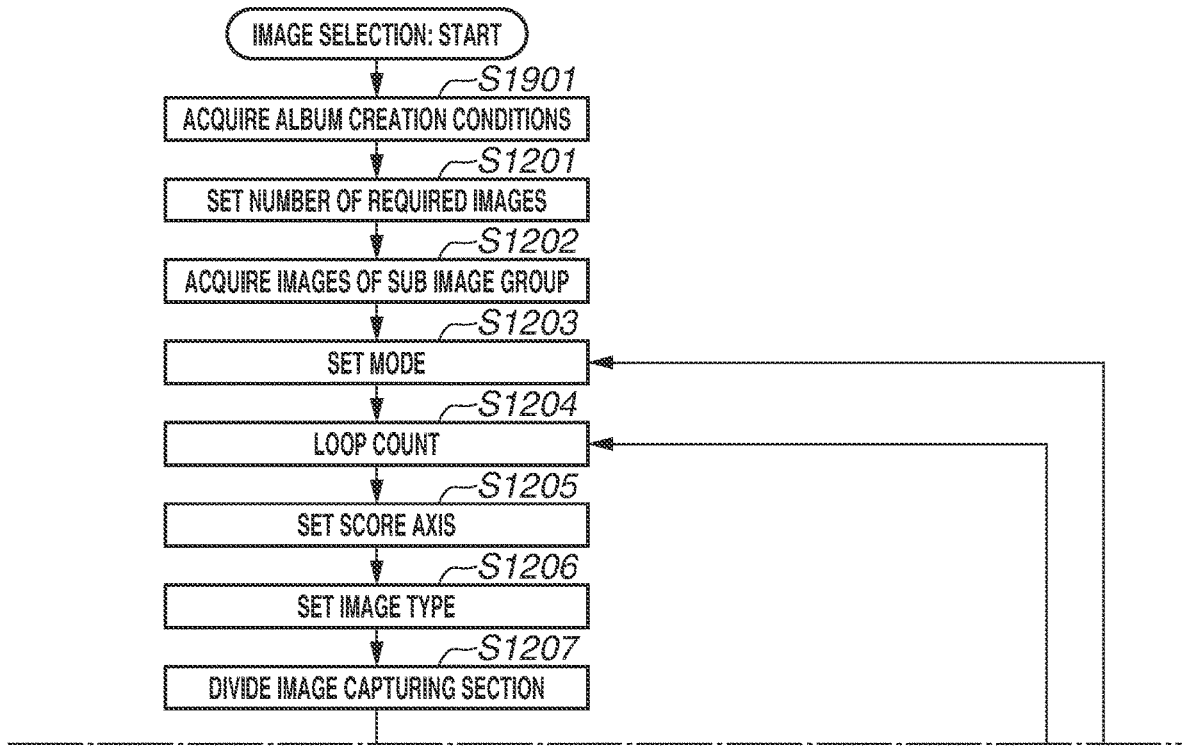

INFORMATION PROCESSING APPARATUS, CONTROL METHOD, AND STORAGE MEDIUM

BACKGROUND

Field of the Disclosure

The present disclosure generally relates to information processing and, more particularly, to an information processing apparatus, a control method, and a storage medium for creating an album.

Description of the Related Art

Japanese Patent Application Laid-Open No. 2013-30161 discusses a technique for executing an automatic layout, thereby creating a photo book.

In recent years, demand for creating a photo book or an album using an automatic layout has been increasing. Thus, a technique for creating a photo book or an album satisfying a user is desired.

SUMMARY

According to one or more aspects of the present disclosure, an information processing apparatus includes a setting unit configured to set a condition for creating an album, a specifying unit configured to, based on pixel information of a target image selected from a plurality of images, specify whether the target image is to be used for the album, a setting unit configured to set a template based on the condition for creating the album, and a placement unit configured to place on the set template the target image to be used for the album according to the specifying by the specifying unit.

Further features of the present disclosure will become apparent from the following description of exemplary embodiments with reference to the attached drawings.

BRIEF DESCRIPTION OF THE DRAWINGS

FIG. 5 is a diagram illustrating image analysis information according to the present disclosure.

FIG. 7 is a diagram illustrating scene classification according to the present disclosure.

FIGS. 8A and 8B are diagrams illustrating image scores according to the present disclosure.

FIGS. 9A to 9I are diagrams illustrating image selection according to the present disclosure.

FIG. 19, which includes FIGS. 19A and 19B, is a diagram illustrating a flowchart of the image selection according to the present disclosure.

DESCRIPTION OF THE EMBODIMENTS

Various exemplary embodiments, features, and aspects of the present disclosure will be described in detail below with reference to the drawings.

A first exemplary embodiment is described taking as an example a method in which an information processing apparatus causes an application (hereinafter also referred to as an "app") for creating an album to operate, thereby generating an automatic layout.

Figure 1:
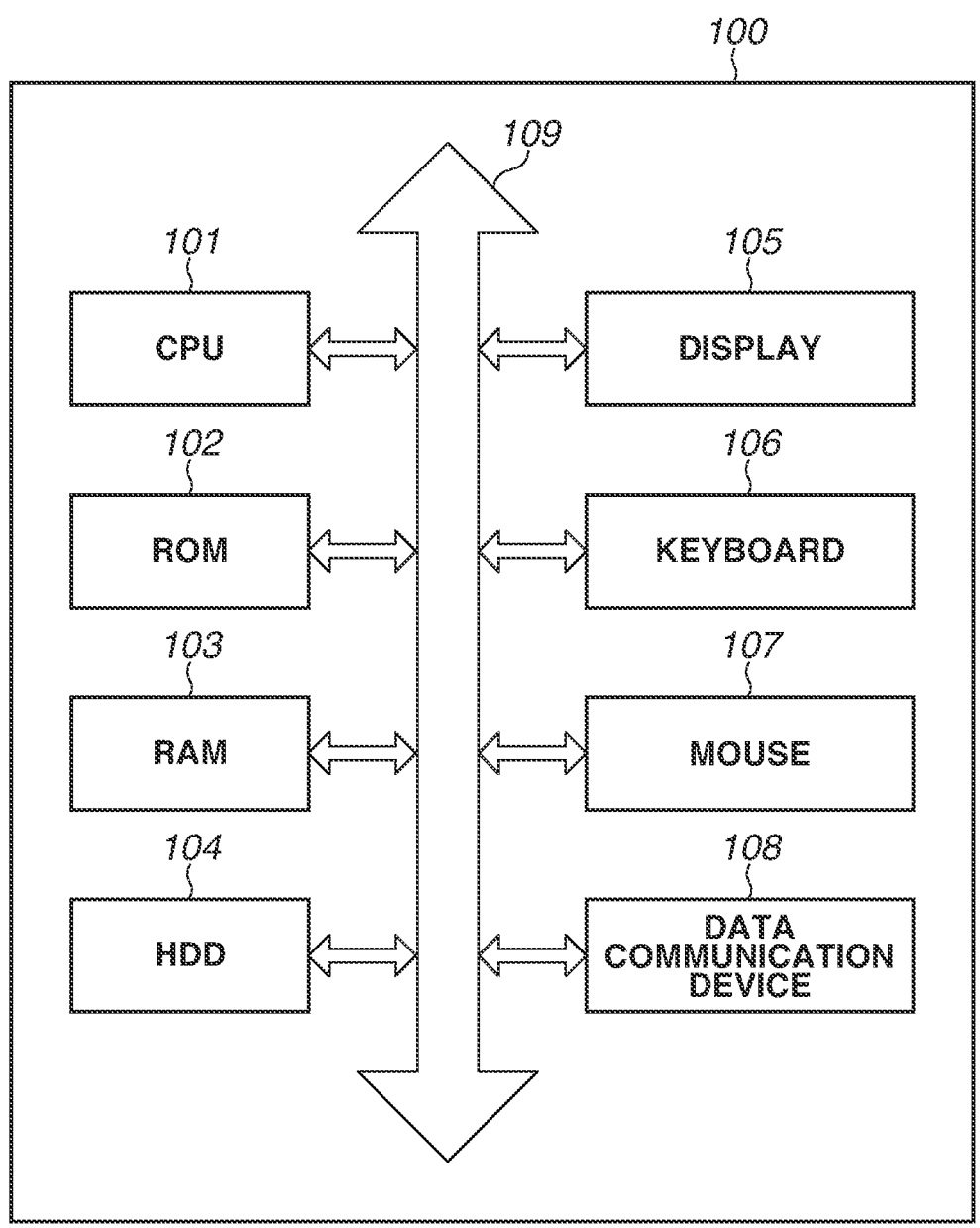
FIG. 1 is a block diagram illustrating hardware capable of executing an application according to the present disclosure.

FIG. 1 is a block diagram illustrating the configuration of the hardware of an information processing apparatus according to the present disclosure. Examples of the information processing apparatus may include a personal computer (PC), a smartphone, a tablet terminal, a camera, printer, or the like. In the present exemplary embodiment, as the information processing apparatus, a PC is used.

In FIG. 1, an information processing apparatus 100 includes a central processing unit (CPU) 101, a read-only memory (ROM) 102, a random-access memory (RAM) 103, a hard disk drive (HDD) 104, a display 105, a keyboard 106, a mouse 107, and a data communication device 108. These components are connected to each other by a data bus 109.

The CPU (central arithmetic unit/processor) 101 is a system control unit and controls the entirety of the information processing apparatus 100. According to a program, the CPU 101, which may include one or more processors, one or more memories, circuitry, or a combination thereof, executes a control method described in the present exemplary embodiment. FIG. 1 illustrates a single CPU. The present disclosure, however, is not limited to the single CPU. Alternatively, a plurality of CPUs may be included.

The ROM 102 stores a program to be executed by the CPU 101. The RAM 103 temporarily stores various information when the CPU 101 executes the program. The HDD 104 stores a database for holding an image file and the processing result of image analysis. In the present exemplary embodiment, the HDD 104 stores an application program for creating an album.

The display 105 is a device for presenting to a user a user interface (UI) and the result of the layout of images in the present exemplary embodiment. The display 105 may have a touch sensor function. The keyboard 106 is one of input devices and, for example, is used to input certain information to the UI displayed on the display 105. In the present exemplary embodiment, for example, the number of double-page spreads in an album is input through the keyboard 106.

The mouse 107 is one of the input devices and, for example, is used to click a button on the UI produced on the display 105.

The data communication device 108 is a device for communicating with an external apparatus such as a printer or a server. For example, data of an automatic layout is transmitted to a printer or a server connected to the PC via the data communication device 108.

The data bus 109 connects the above components (102 to 108) and the CPU 101. Further, flowcharts described below are achieved by the CPU 101 reading a program related to the flowcharts from the RAM 103 and executing the program.

Figure 2:
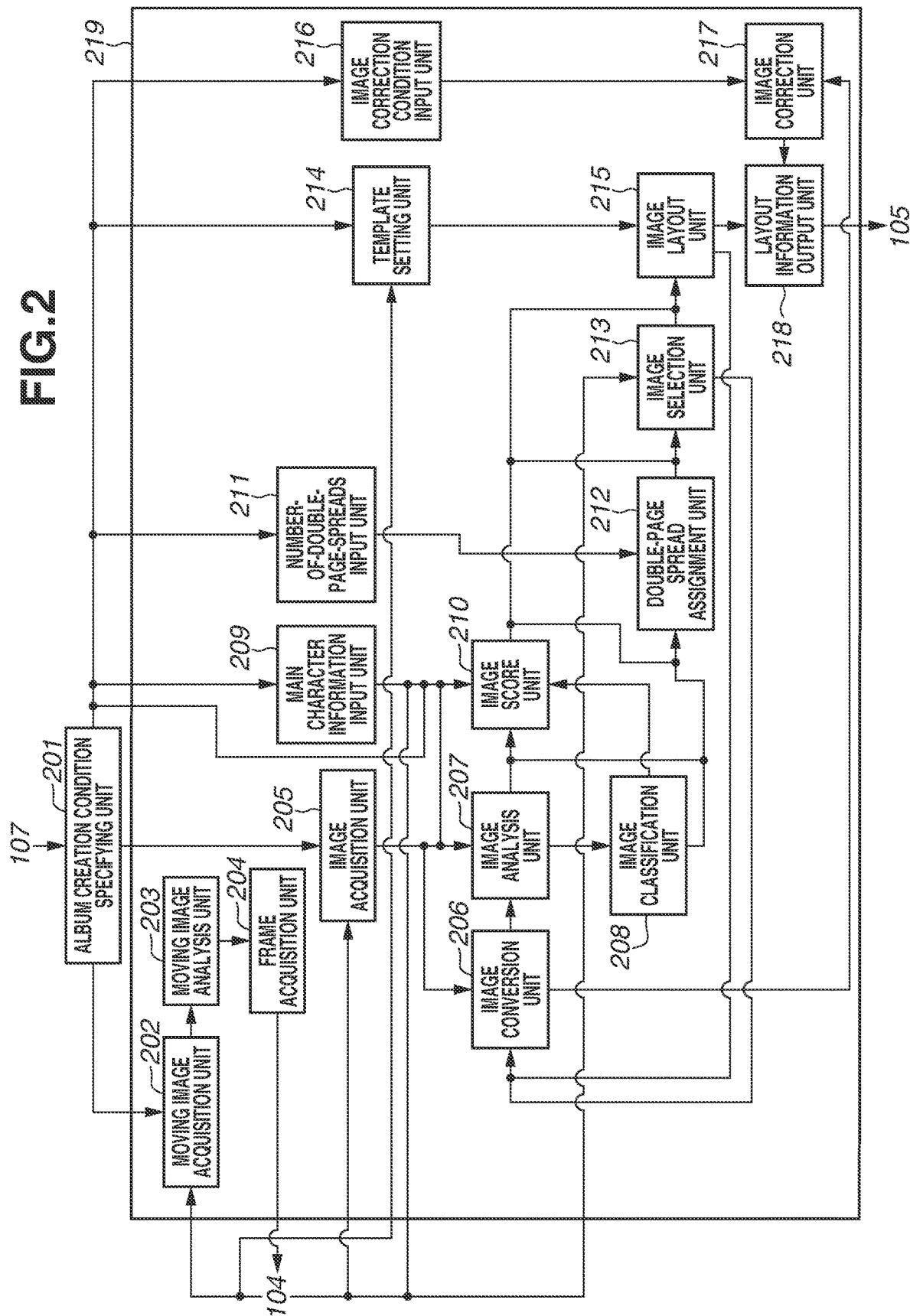
FIG. 2 is a block diagram illustrating software for an application according to the present disclosure.

FIG. 2 is a block diagram illustrating software for an album creation application according to the present disclosure. In the present exemplary embodiment, the album creation application saved in the HDD 104 is started by the user double-clicking an icon of the application produced on the display 105, using the mouse 107.

Although the album creation application has various functions, in the present exemplary embodiment, a description is particularly given of an automatic layout function provided by an automatic layout processing unit 219. As illustrated in FIG. 2, the application includes an album creation condition specifying unit 201 and an automatic layout processing unit 219. The automatic layout function classifies a captured photograph based on the content or the attribute of the photograph, or selects and lays out photographs, thereby generating an album image to be produced on the display 105.

According to an operation on the UI using the mouse 107, the album creation condition specifying unit 201 specifies album creation conditions for the automatic layout processing unit 219. In the present exemplary embodiment, as the album creation conditions, a main character, the number of double-page spreads, the type of template, the mode of album creation, information regarding whether to correct an image, the number of double-page spread photographs for adjusting the number of photographs to be placed per double-page spread in an album, and a product for creating the album are specified.

An image and a moving image as layout targets may be specified using accompanying information or attribute information of individual pieces of image data. For example, the user may specify shooting date and time, thereby selecting an image and a moving image captured at the specified date and time, as candidates (an image group) for layout targets. Further, the user may specify a device or a directory, thereby selecting an image and a moving image as candidates (an image group) for layout targets. For example, a "double-page spread" corresponds to a single display window in display and corresponds to a pair of pages adjacent to each other and printed on different sheets.

A moving image acquisition unit 202 acquires from the HDD 104 a moving image group (a moving image data group) that meets the conditions specified by the album creation condition specifying unit 201. The "moving image group" refers to a candidate moving image group in which images clipped from a moving image are to be used for a layout when a single album is created. The acquired moving image data is decompressed from a compressed state using a moving image decoder provided as standard in an operating system (OS). The decompressed moving image data is used for analysis.

A moving image analysis unit 203 analyzes the moving image data acquired by the moving image acquisition unit 202. In the analysis, successive frames are clipped from the moving image, and the amount of difference between previous and subsequent frames is calculated. If the subsequent frame has a great amount of difference from the previous frame, the previous and subsequent frames are not similar to each other. Thus, it is determined that the frames have a large amount of motion. If the subsequent frame has a small amount of difference from the previous frame, it is determined that the previous and subsequent frames are similar to each other. The amount of motion may also be determined using a motion vector used in the moving image format, instead of the difference between the frames.

The moving image analysis unit 203 selects frames as analysis targets according to the determined amount of motion. Based on how large the amount of motion is, the moving image data can be divided into a section where the image is moving and a section where the image stops. In a section where the amount of motion is larger as a result of the determination, the intervals between the frames as the analysis targets are made shorter. In a section where the amount of motion is smaller as a result of the determination, the intervals between the frames as the analysis targets are made longer. For example, in a section where the amount of motion is large, the moving image analysis unit 203 selects the frames as the analysis targets at five-frame intervals. In a section where the amount of motion is small, the moving image analysis unit 203 selects the first, last, and middle frames of the section as the frames as the analysis targets. Then, the moving image analysis unit 203 performs an analysis process on the frames as the analysis targets. Items to be analyzed are, for example, the detection of an object such as a face or an animal for use in a layout, the determination of the size of an object, and regarding the face, smile determination, eye-closing determination, blur determination, and the brightness of the entirety of the image.

According to the results of the determination items, scores are calculated for the frames as the analysis targets. In the detection of an object, a frame including an object such as a face or an animal for use in a layout obtains a high score. Further, in the determination of the size of an object, a frame including a detection target object of a large size obtains a high score. In the smile determination, a frame including a large number of faces determined as smiles obtains a high score. In the eye-closing determination, a frame including a large number of faces in which the eyes are not closed according to the determination obtains a high score. In the blur determination, the edge amount of the image is calculated using a Laplacian filter, and a frame having a large edge amount obtains a high score. Regarding the brightness of the entirety of the image, a frame in which the average luminance of the image is equal to or greater than a predetermined value obtains a high score. Ultimately, the moving image analysis unit 203 calculates a total score, which is the sum of the scores for the respective items.

Additionally, a region where a blur is determined may be changed according to the determined amount of motion. For example, in a case where a moving object is tracked when a moving image is captured, the object is clearly captured, but the background is blurred. Thus, the entirety of the image is blurred. Thus, in a case where the amount of motion is large, the moving image analysis unit 203 can also use a method for determining only the blur amount of an object region such as a face. The moving image analysis unit 203 selects a clipping target from the divided sections, a frame of which the total score is equal to or greater than a predetermined value.

Based on the result of the analysis by the moving image analysis unit 203, a frame acquisition unit 204 clips the frame from the moving image and saves the frame as image data in the HDD 104. At this time, the frame acquisition unit 204 saves the amount of motion determined by the moving image analysis unit 203, camerawork, and the score in association with the clipped image data. When saving the frame, based on the determined score, the frame acquisition unit 204 may save the frame in association with its use such as an image for use in the album or a candidate image to be used for replacement by the user after the album is created.

An image acquisition unit 205 acquires from the HDD 104 an image group (an image data group) specified by the album creation condition specifying unit 201. The "image group" refers to a candidate image group to be laid out when a single album is created. For example, in a case where "January 1, XX to December 31, XX" is specified in the album creation condition specifying unit 201, all images captured from January 1, XX to December 31, XX belong to the specified image group. The image acquisition unit 205 also acquires width and height information of each image of the relevant image group.

Examples of an image saved in the HDD 104 include a still image and an image clipped from a moving image. The still image or the clipped image is acquired from a digital camera or an image capturing device such as a smart device. The image capturing device may be included in the information processing apparatus 100, or may be included in an external apparatus. In a case where the image capturing device is an external apparatus, the image is acquired via the data communication device 108. Further, the still image or the clipped image may be an image acquired from a network or a server via the data communication device 108. Examples of the image acquired from the network or the server include a social networking service image (hereinafter referred to as an "SNS image").

A program executed by the CPU 101 analyzes, with respect to each image, data accompanying the image to determine the saving source of the image. The SNS image may be acquired from an SNS via the application, and the acquisition destination of the SNS image may be managed in the application. The image is not limited to the above images, and may be an image of another type.

An image conversion unit 206 converts the number of pixels and color information of image data. In the present exemplary embodiment, the image conversion unit 206 converts image data into image data in which the number of pixels is 420 pixels on the short side, and color information is given in sRGB.

An image analysis unit 207 performs an analysis process on image data. In the present exemplary embodiment, the image analysis unit 207 performs an analysis process on the image data converted by the image conversion unit 206. Specifically, the image analysis unit 207 acquires feature amounts from the image data and executes object determination, face detection, expression recognition of a detected face, and individual recognition of a detected face in the image data. Further, the image analysis unit 207 acquires shooting date and time from data (e.g., Exchangeable image file format (Exif) information) accompanying the image acquired from the HDD 104.

An image classification unit 208 performs scene division on the acquired image group, i.e., the image group specified by the album creation condition specifying unit 201. The scene division is performed using the shooting date and time information, the number-of-images information, and the information of a detected face. A "scene" refers to a shooting scene such as a travel, a daily life, or a wedding ceremony. Further, a "scene" may refer to, for example, an assemblage of images captured at one shooting opportunity regarding a single shooting target.

A main character information input unit 209 inputs to an image score unit 210 the identification (ID) (identification information) of the main character specified by the album creation condition specifying unit 201.

The image score unit 210 scores images. In the present exemplary embodiment, the image score unit 210 marks scores for images such that an image suitable for a layout has a high score. When marking the score such that an image suitable for a layout has a high score, the image score unit 210 uses analysis information of the images, the classification results of the images, main character information, image information, and album creation conditions. Further, another piece of information may be additionally or alternatively used.

A number-of-double-page-spreads input unit 211 inputs to a double-page spread assignment unit 212 the number of double-page spreads in the album specified by the album creation condition specifying unit 201.

The double-page spread assignment unit 212 divides an image group and assigns the divided image groups to double-page spreads. A "double-page spread" refers to, for example, two pages obtained when the user opens an album. Although a description is given using double-page spreads, the description may also be given using the pages. The double-page spread assignment unit 212 divides an image group according to the input number of double-page spreads and assigns parts of the image group to double-page spreads. For example, in a case where the number of double-page spreads is five, the double-page spread assignment unit 212 divides an acquired image group into five small image groups and assigns each image group to a single double-page spread.

Based on the scores given by the image score unit 210, an image selection unit 213 selects images from the image groups assigned to the double-page spreads by the double-page spread assignment unit 212.

A template setting unit 214 reads from the HDD 104 a plurality of templates according to the template information specified by the album creation condition specifying unit 201 and inputs the plurality of templates to an image layout unit 215.

The image layout unit 215 determines the layout of images. Specifically, the image layout unit 215 selects, from the plurality of templates input by the template setting unit 214, a template suitable for the images selected by the image selection unit 213 and determines the layout (the placement positions) of the images.

According to the layout of the images determined by the image layout unit 215, a layout information output unit 218 outputs layout information to be displayed on the display 105. The layout information is, for example, bitmap data obtained by laying out (placing) the selected images on the selected template.

An image correction unit 217 executes dodging correction, red-eye correction, and contrast correction. An image correction condition input unit 216 inputs to the image correction unit 217 an on/off condition of image correction specified by the album creation condition specifying unit 201. The on or off state of the image correction may be specified with respect to each type of correction, or may be collectively specified for all types of correction.

If the image correction condition is on, the image correction unit 217 corrects an image. If the image correction condition is off, the image correction unit 217 does not correct an image. The number of pixels of the image to be input from the image conversion unit 206 to the image correction unit 217 can be changed according to the sizes of the layout images determined by the image layout unit 215. In the present exemplary embodiment, after the layout images are generated, each image is corrected. The present disclosure, however, is not limited to this method. Alternatively, before images are laid out (placed) on double-page spread pages, each image may be corrected.

Figure 3:
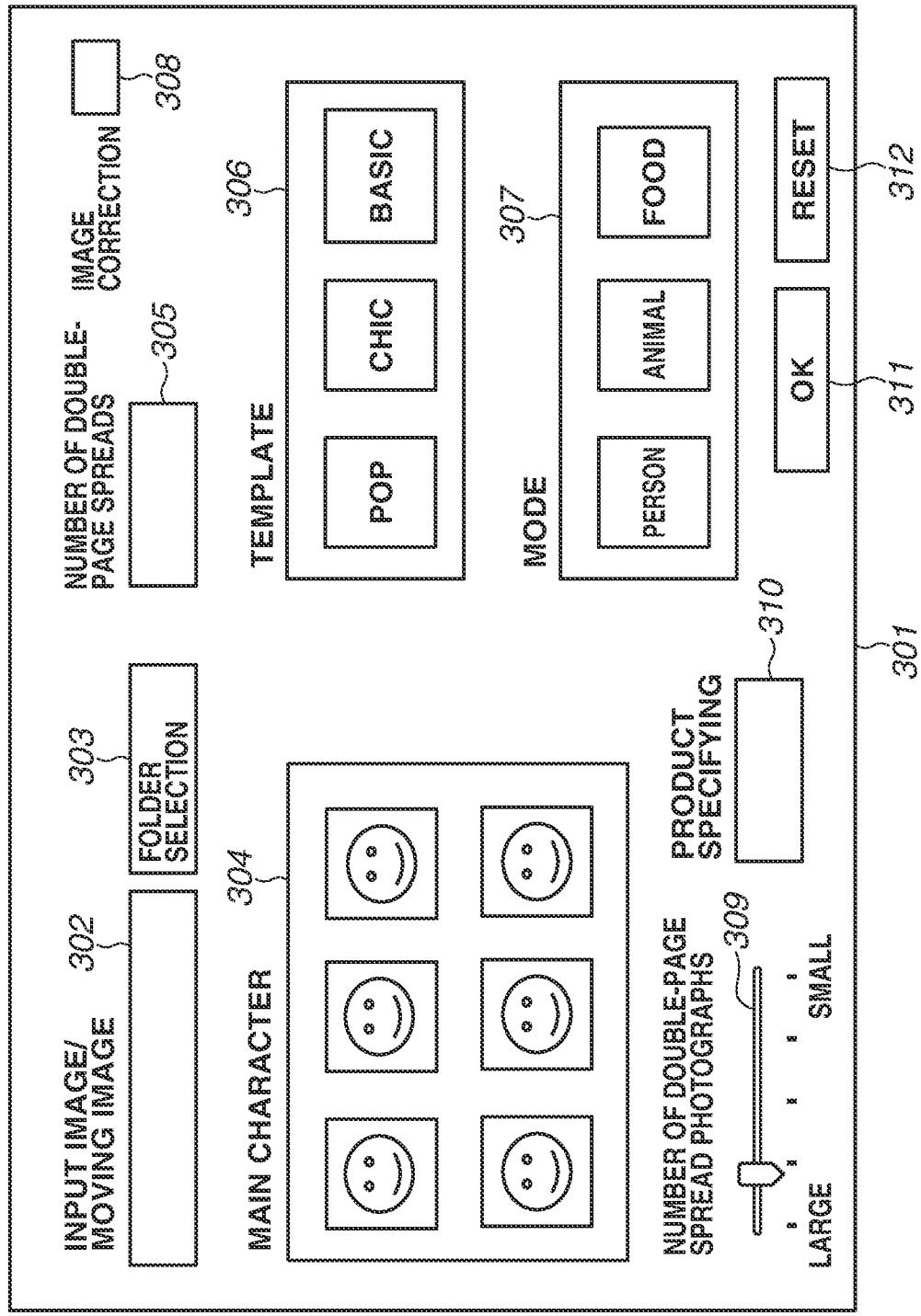
FIG. 3 is a diagram illustrating a display screen produced by the application according to the present disclosure.

The layout information output from the layout information output unit 218 is, for example, displayed on the display 105 in a format as illustrated in FIG. 3.

If the album creation application according to the present exemplary embodiment is installed on the information processing apparatus 100, a start icon of the album creation application is displayed on a top screen (a desktop) of the OS. If the user double-clicks the start icon on the desktop displayed on the display 105, using the mouse 107, the program of the album creation application saved in the HDD 104 is loaded into the RAM 103. The program in the RAM 103 is executed by the CPU 101, thereby starting the album creation application.

FIG. 3 illustrates a display screen 301 provided by the started album creation application. The display screen 301 is produced on the display 105. The user can set creation conditions for the album through the display screen 301. The user can set creation conditions described below for the album through the display screen 301. The display screen 301 includes a path box 302 and a "folder selection" button 303 as a specifying unit for specifying an image/moving image group. The path box 302 of the display screen 301 is used to specify the save location of (the path to) an image/moving image group as an album creation target in the HDD 104.

The "folder selection" button 303 is a button for selecting from a displayed tree structure a folder including the image/moving image group as the album creation target. If the user clicks the "folder selection" button 303 using the mouse 107 and selects from the displayed tree structure a folder including the image/moving image group as the album creation target, the folder path to the selected folder including the image/moving image group is displayed in the path box 302.

A main character specifying unit 304 displays a plurality of face images of people as icons so that a main character can be specified by selecting any of the icons. The main character specifying unit 304 displays the face image for each person. In other words, the main character specifying unit 304 displays a single face image for a single person, and each face image is associated with an individual ID. The main character specifying unit 304 is used to identify a main character as a central figure from people in captured images as analysis targets. The face image is, for example, detected from an image in advance and registered in association with an individual ID in a face database. An icon included in the main character specifying unit 304 is, for example, the face image of a person selected by the user or the face image of a person determined by a method described below among face images of people registered in the face database. In the main character specifying unit 304, a plurality of icons of face images of different people is arranged and can be selected by clicking the icons using the mouse 107. The main character can be automatically set by a procedure in FIG. 4. Alternatively, the main character can also be manually set by the user specifying the main character using the main character specifying unit 304. The person of an icon selected by the user among the icons displayed in the main character specifying unit 304 is specified as the main character.

A "number of double-page spreads" box 305 is a box for specifying the number of double-page spreads in the album. The user can directly input a number to the "number of double-page spreads" box 305 using the keyboard 106 or input a number to the "number of double-page spreads" box 305 from a list using the mouse 107.

A template specifying unit 306 displays a plurality of icons, which are illustration images showing the tastes (pop, chic, etc.) of templates. The template specifying unit 306 is configured to receive the specifying of a template. In the present exemplary embodiment, a "template" includes image placement frames (slots) for placing images. In the template specifying unit 306, icons of a plurality of templates are arranged so that any of the templates can be selected by clicking the template using the mouse 107.

A mode specifying unit 307 displays a plurality of icons, which are illustration images showing an object to be taken into account when the album is created. The mode specifying unit 307 allows the user to specify an object. The present exemplary embodiment is described using three types, namely a "person", an "animal", and "food", as objects. Alternatively, another object may be selected. Further, although a plurality of objects can be simultaneously specified, a single object is selected in this case for ease of description. The object to be taken into account can be specified by clicking the object using the mouse 107.

A check box 308 allows the user to specify the on/off state of the image correction. If the check box 308 is checked using the mouse 107, the image correction is turned on. If the check box 308 is not checked, the image correction is turned off. In the present exemplary embodiment, all types of image correction are turned on or off using a single button. The present disclosure, however, is not limited to this method. Alternatively, a check box may be provided for each type of image correction.

"Number of double-page spread photographs" 309 allows the user to set, using a slider bar, the number of images to be placed on each double-page spread in the album to be created. If the slider bar is set to a "large" side, the number of images to be placed on each double-page spread is increased. If the slider bar is set to a "small" side, the number of images to be placed on each double-page spread is reduced.

A product specifying unit 310 sets a product for the album to be created. As the product, the size of the album and the sheet type of the album can be set. The cover type or the type of binding portion may be individually set.

An "OK" button 311 is a button for determining the conditions selected on the display screen 301 as album creation conditions. If the user clicks (selects) the "OK" button 311 using the mouse 107, the album creation conditions are finalized and transmitted to the automatic layout processing unit 219 via the album creation condition specifying unit 201. Specifically, the path input into the path box 302 is transmitted to the image acquisition unit 205. The individual ID of the main character selected using the icon included in the main character specifying unit 304 is transmitted to the main character information input unit 209. The number of double-page spreads input into the "number of double-page spreads" box 305 is transmitted to the number-of-double-page-spreads input unit 211. The template information selected using the icon included in the template specifying unit 306 is transmitted to the template setting unit 214. The on/off state of the image correction specified in the image correction check box 308 is transmitted to the image correction condition input unit 216.

A "reset" button 312 is a button for resetting setting information on the display screen 301.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Figure 4:
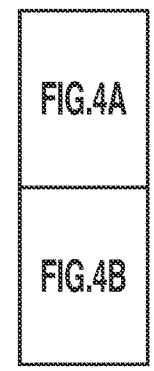
FIG. 4, which includes
Figure 4A:
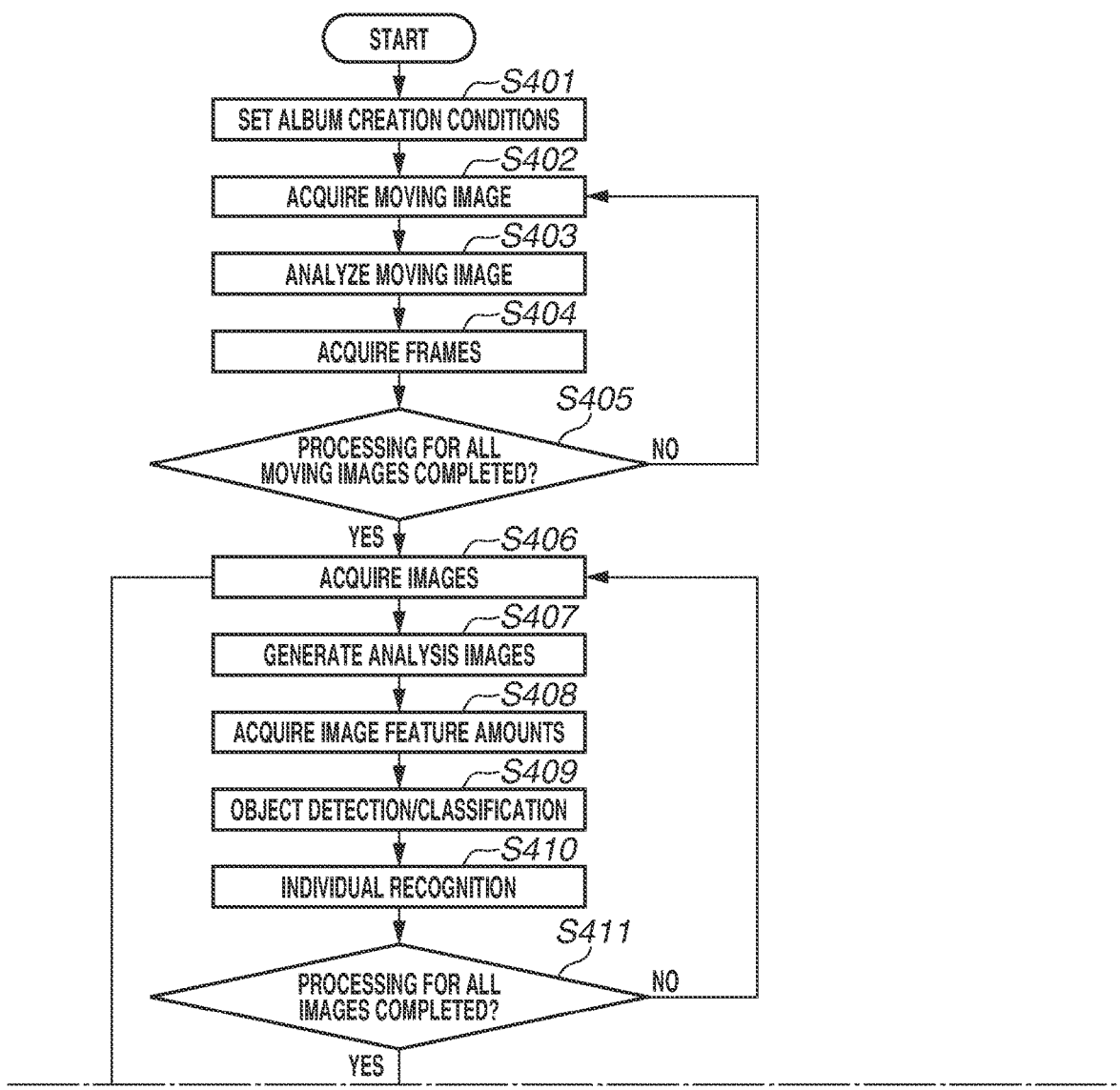
FIGS. 4A and 4B, is a processing flowchart of an automatic layout according to the present disclosure.
Figure 4B:
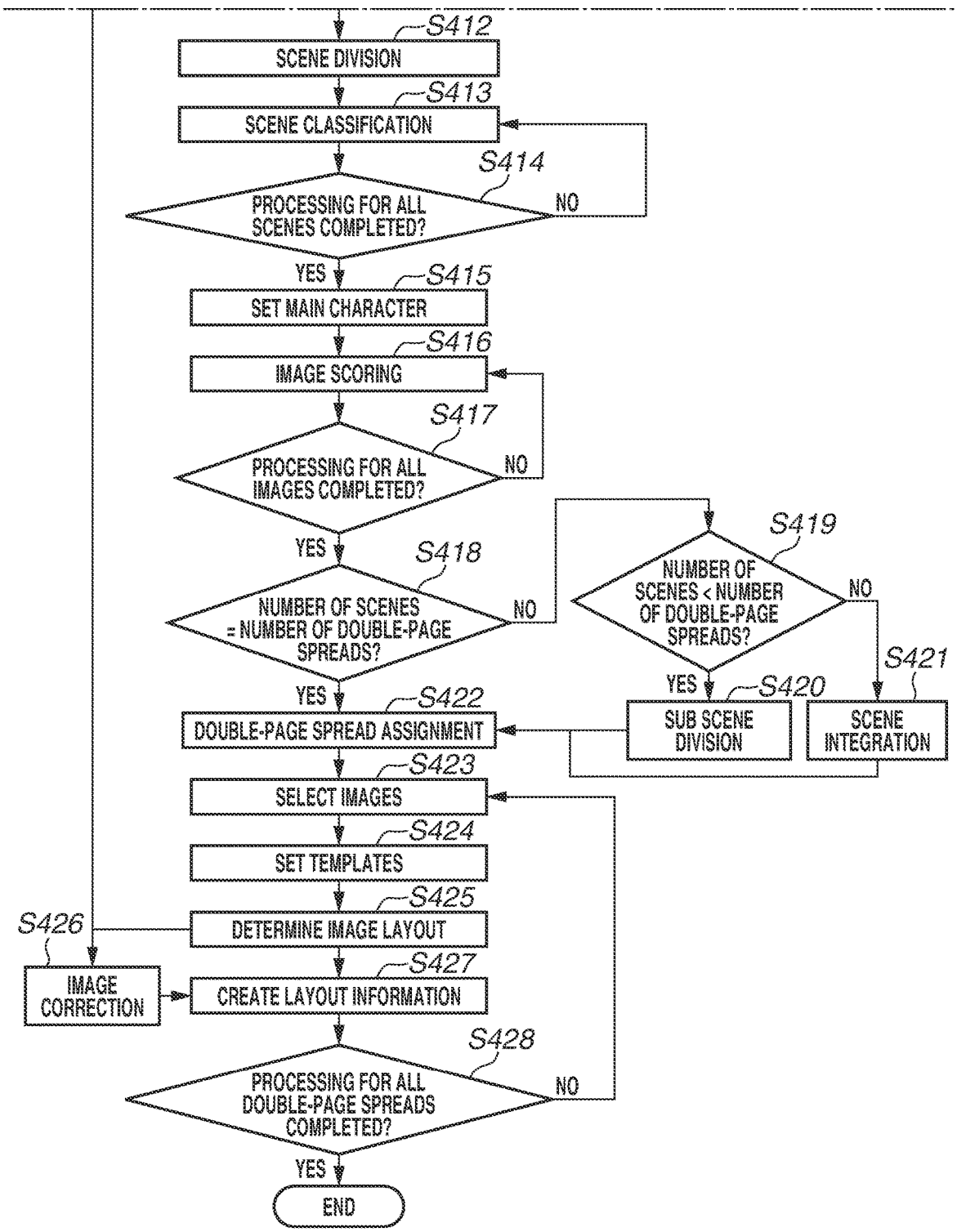

FIG. 4, which includes FIGS. 4A and 4B, is a flowchart illustrating the processing flow for executing an automatic layout of the album creation application according to the present exemplary embodiment. The flowchart illustrated in FIG. 4 is achieved by, for example, the CPU 101 loading the program stored in the HDD 104 into the ROM 102 or the RAM 103 and executing the program. With reference to FIG. 4, the processing flow of an automatic layout is described below. As illustrated below, in the present exemplary embodiment, when an album is created, an image group for creating the album is divided according to shooting time, and images to be placed on pages are selected from the divided sub image groups (hereinafter also referred to as "sections").

In step S401, the CPU 101 sets album creation conditions using the album creation condition specifying unit 201. As the album creation conditions, for example, one or more of the product type of an album, the product size of the album, or the sheet type to be used for the album is set. These creation conditions are used, for example, to determine R2 in FIG. 17. In step S402, the CPU 101 acquires moving image data using the moving image acquisition unit 202. The CPU 101 sets information regarding a moving image/ image group for creating the album, a main character, the number of double-page spreads, a template, the mode, and the image correction.

In step S403, the CPU 101 analyzes the acquired moving image data using the moving image analysis unit 203. For example, in step S403, scores obtained by combining the resultant amount of motion, camerawork, a blur, and an expression are calculated. Further, based on the calculated scores, images may be divided into images as layout candidates to be placed in the album according to the analysis results, and images as editing candidates to be replaced when the user performs an editing operation. A frame in which the value of the calculated score is equal to or greater than a predetermined threshold is determined as a layout candidate.

In step S404, based on the analysis results of the moving image data, the CPU 101 clips frames from the moving image data and saves the clipped frames as image data in the HDD 104. The analysis results (the amount of motion, camerawork, and the scores) corresponding to the saved frames are saved in the HDD 104 in association with the frames.

In step S405, the CPU 101 determines whether steps S402 to S404 are completed for all moving images of a moving image group in the HDD 104. If steps S402 to S404 are not completed (No in step S405), the processing returns to step S402. If steps S402 to S404 are completed (Yes in step S405), the processing proceeds to step S406.

In step S406, the CPU 101 reads images included in a specified image group from the HDD 104 and loads the images into the RAM 103.

In step S407, the CPU 101 generates analysis image data using the image conversion unit 206. The analysis image data is image data specified by the album creation condition specifying unit 201 and obtained by converting each piece of image data of the image group acquired from the HDD 104 into a desired number of pixels and desired color information. The number of pixels and the color information into which each piece of image data is converted are determined in advance and saved in the program or a parameter file used by the program. In the present exemplary embodiment, input image data is converted into analysis image data having a size of 420 pixels on the short side and sRGB color information.

In step S408, the CPU 101 acquires the image feature amounts of the analysis image data using the image analysis unit 207. For example, the CPU 101 acquires shooting date and time from information accompanying each piece of image data included in the image group acquired from the HDD 104. In the present exemplary embodiment, the CPU 101 acquires the shooting date and time from Exif information accompanying each piece of image data. Further, the CPU 101 acquires a feature amount regarding image quality from the analyzed image data generated in step S407. Examples of the feature amount regarding image quality include a focus. As the detection method for detecting an edge, a known Sobel filter can be used. The edge of each image is detected using a Sobel filter, and the difference in luminance between the start and end points of the edge is divided by the distance between the start and end points, thereby calculating the slope of the edge, i.e., a luminance gradient. The average slope of the edge in each image is calculated. Then, it can be determined that an image having a large average slope is more in focus than an image having a small average slope. In the present exemplary embodiment, a plurality of slope thresholds is set, and it is determined whether the focus amount of the image is acceptable, depending on whether it is equal to or greater than any slope thresholds. In the present exemplary embodiment, two different slope thresholds are set, and the focus amount is determined on a three-point scale of "○", "Δ", and "×". If the average slope of the edge in an image is equal to or greater than a first threshold, the slope of the focus is "○" (suitable). If the average slope of the edge is equal to or greater than a second threshold, which is lower than the first threshold, the slope of the focus is "Δ" (acceptable). If the average slope of the edge is less than the second threshold, the slope of the focus is "×" (unacceptable).

In step S409, the CPU 101 executes object detection and recognition on each piece of image data using the image analysis unit 207. For example, the CPU 101 detects a face from the analysis image data generated in step S407. The face can be detected using a known method. Examples of the known method include AdaBoost, which creates a strong discriminator from a plurality of prepared weak discriminators. In the present exemplary embodiment, the face of a person (an object) is detected using the strong discriminator created by AdaBoost. Further, in step S409, the CPU 101 detects (extracts) a face image and also acquires the upper-left coordinate value and the lower-right coordinate value of the position of the detected face image in the image. The "image" used here is an image represented by the analysis image data generated in step S407. These two types of coordinate values are identified, whereby it is possible to identify the position of the face of the person and the size of the face. Further, the CPU 101 also executes AdaBoost for detecting each of an animal such as a dog or a cat and food similarly to a face and thereby can detect an object such as a person, an animal, or food and simultaneously classify it into some object. The present disclosure is not limited to the above, and an object may be a flower, a building, or a figurine. A description has been given taking, as an example, object classification using AdaBoost. Alternatively, image recognition using a deep neural network may be used.

In step S410, the CPU 101 executes individual recognition using the image analysis unit 207. First, the CPU 101 determines the similarity between the face image extracted in step S409 and a representative face image saved with respect to each individual ID in the face dictionary database. Then, the CPU 101 determines the individual ID of a face image having a similarity equal to or greater than a threshold and having the highest similarity, to be the ID of the extracted face image. That is, a person corresponding to the individual ID of a face image having a similarity equal to or greater than the threshold and having the highest similarity is identified as the person of the face image extracted in step S409. If the similarity is less than the threshold, the CPU 101 assigns a new individual ID as a new person to the extracted face image and registers the new individual ID in the face dictionary database. Image analysis information of each image data acquired in steps S408 to S410 is stored in the HDD 104 as distinguished for each ID for identifying an image as illustrated in FIG. 5. The shooting date and time information and the focus determination result acquired in step S408, and the number of faces and the position information detected in step S409 are saved as the image analysis information of each image data.

There is a case where an image based on a single piece of image data includes a plurality of face images. Position information of a face is stored as distinguished for each individual ID acquired in step S410. If a face is not detected in the image data, the shooting date and time information and the focus determination result acquired in step S408 are saved. Further, major objects included in the image are saved in descending order of reliability when AdaBoost is executed. At this time, if a major object is not detected, the information acquired in step S408 is not stored. Information of an object other than a face is similarly stored. AdaBoost successively connects weak discriminators for recognizing patterns, thereby forming a single strong discriminator. Thus, the more the weak discriminators coinciding with patterns learned in advance by AdaBoost are, the higher the reliability is. In the present case, the object determination has been described using AdaBoost as an example. Alternatively, discriminators using a convolutional neural network such as a deep neural network may be used.

In step S411, the CPU 101 determines whether steps S407 to S410 are completed for all the images of the image group of the HDD 104 specified by the album creation condition specifying unit 201. If steps S407 to S410 are not completed (No in step S411), the processing returns to step S406. If steps S407 to S410 are completed (Yes in step S411), the processing proceeds to step S412.

Figure 6A:
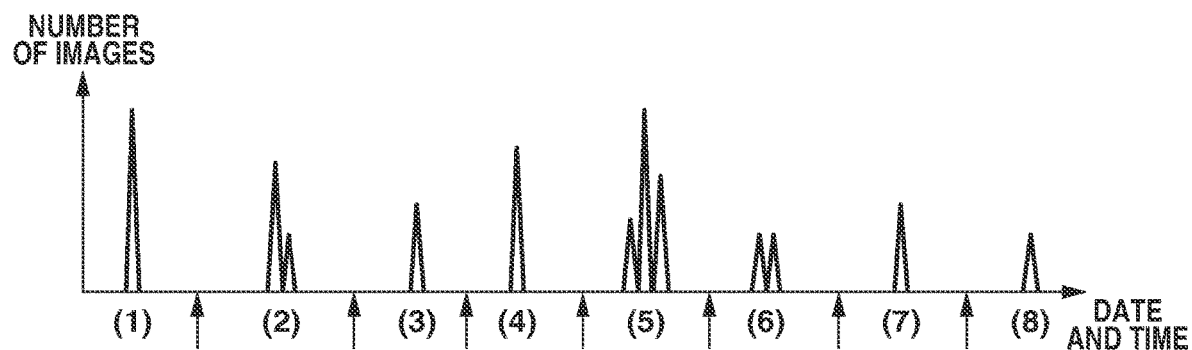
FIGS. 6A, 6B, and 6C are diagrams illustrating image group division according to the present disclosure.

In step S412, the CPU 101 performs scene division using the image classification unit 208. The "scene division" refers to the division of an acquired image group into a plurality of sub image groups according to a scene. Specifically, based on the shooting date and time information acquired in step S408, an image group is divided into a plurality of sub image groups according to the difference in time between images. An example of a criterion for the division is as follows. The CPU 101 first pays attention to, for example, an image with the oldest (or newest) shooting date and time in an image group specified by the album creation condition specifying unit 201. Then, the CPU 101 references the difference in time between the image with the oldest shooting date and time and an image with the second oldest (or newest) shooting date and time. The CPU 101 repeatedly executes this reference process while sequentially replacing the image of interest with an image with newer (or older) shooting date and time. Then, the CPU 101 determines a condition, to which the reference result corresponds, from following conditions. In the following description, "division" means dividing an image group into the one with newer shooting date and time, and the one with older shooting date and time, at the boundary between two images. In a case where the shooting dates of images are not consecutive, i.e., a day when no image is captured is present between images, the image group is divided into sub image groups taking the day when no image is captured as the boundary. Next, a case is described where the shooting dates are consecutive ones. In the present exemplary embodiment, if the difference between the shooting times of the images is 16 hours or more, the image group is divided into sub image groups. If the difference between the shooting time of the images is less than 16 hours, and if the difference in time between the capturing of the first image and the capturing of the last image on each consecutive day is less than four hours, the image group is divided such that an image group of images captured on the same day belongs to the same sub image group. In the present exemplary embodiment, if the difference in time between the capturing of the first image and the capturing of the last image on each consecutive day is four hours or more, and if the number of the images captured on each consecutive day is less than 50, the image group is divided such that an image group of the images captured on the same day belongs to the same sub image group. If the number of images captured on each consecutive day is 50 or more, the image group is not divided. A threshold for the difference in time and a threshold for the number of images when the division is performed are not limited to these. FIG. 6A illustrates the result of dividing the image group by the above scene division method.

In step S413, the CPU 101 executes scene classification with the image classification unit 208. The present exemplary embodiment is described taking as an example a case where each sub image group (each scene) is classified into three types, namely a travel, a daily life, and a ceremony. The classification, however, is not limited to this. In the present exemplary embodiment, an example is described where the types of scenes include a "travel", a "daily life", and a "ceremony", and a sub image group is classified into any of these scenes. To mark the score for the scene classification, a scene classification table is used where information of feature amounts corresponding to the types of scenes is stored.

A description is given of the creation method for creating the scene classification table stored in advance in the program. First, the designer of the program collects a plurality of image data groups determined in advance as being classified into scenes including a "travel", a "daily life", and a "ceremony". Then, the feature amounts of the collected image data groups are acquired. Examples of the acquired feature amounts include an image capturing period, the number of captured images, and the number of captured people. The image capturing period is the difference in shooting time between image data generated first and image data generated last in each image data group. The number of captured images is the number of images in each image data group. The number of captured people is the average number of faces included in images indicated by each image data group. As a result, for example, regarding a single image data group including a plurality of pieces of image data determined as a travel scene in advance, the feature amounts of the image capturing period, the number of captured images, and the number of captured people are acquired. The feature amounts are not limited to the image capturing period, the number of captured images, and the number of captured people. Alternatively, another feature amount may be used, or only some of these feature amounts may be used.

Then, also regarding another image data group collected in advance, the feature amounts such as the image capturing period, the number of captured images, and the number of captured people are acquired as described above. Next, based on the feature amounts acquired from the plurality of image data groups collected with respect to each scene, the average value and the standard deviation of the image capturing period, the average value and the standard deviation of the number of captured images, and the average value and the standard deviation of the number of captured people per image are obtained. The thus obtained values and the types of scenes are associated with each other, thereby creating a scene classification table (FIG. 7) illustrating the average values and the standard deviations with respect to each type of scene. FIG. 7 illustrates examples of the average values and the standard deviations of the image capturing period (hours), the number of captured images (images), and the number of captured people (people). The obtained values are built into the program for the album creation application in advance. That is, parameters are created by learning at the design stage using the images collected in advance and are built into the program. The CPU 101 calculates the average value of each of the image capturing period, the number of captured images, and the number of captured people for each sub image group divided in step S412. Then, with respect to each scene, based on the average value and the standard deviation of each of the feature amounts such as the image capturing period, the number of captured images, and the number of captured people of each sub image group, the scores are marked using the following formulas.

The score for each scene and feature amount=50−
|10×(the average value for each scene and feature amount−the feature amount with respect to each sub image group)/the standard deviation for each scene and feature amount| (formula 1)

The average score for each scene=(the score of the image capturing period for each scene+the score of the number of captured images for each scene+the score of the number of people for each scene)/the number of feature amount items (formula 2)

Here, formula (1) is calculated regarding each of the image capturing period, the number of captured images, and the number of captured people. Formula (2) is calculated from the calculation results of formula (1). At this time, as the average value and the standard deviation used in formula (1), the values registered in the scene classification table (FIG. 7) are used. As the feature amount, the values of the image capturing period, the number of captured images, and the number of captured people for each division image group are used. Further, the number of feature amount items is three in this example.

Based on the above, the average score of a sub image group of interest for each of a travel, a daily life, and a ceremony is calculated. Then, the image classification unit 208 classifies image data of each divided group into a scene corresponding to the highest score among the above types of scenes. If two or more scenes have the same score, the image classification unit 208 classifies the scenes according to priority order. For example, in the present exemplary embodiment, it is determined in advance that priority is given in order of a daily life>a ceremony>a travel, and the priority of a daily life is the highest. The order of priority is not limited to this. Further, the user may be allowed to set the order of priority.

The scene division and the scene classification are described taking an example. In FIG. 6A, in a sub image group (5) after scene division is performed, the image capturing period from an image captured first to an image captured last in the sub image group 5 is 36 hours, the number of captured images is 300, and the number of captured people is 1.7. The average score of a travel is 45.32, the average score of a daily life is 18.38, and the average score of a ceremony is −29.92. Thus, the scene of the sub image group 5 is classified into a travel. The sub image group is managed in association with a scene ID so that the scene can be identified.

In step S414, the CPU 101 determines whether the scene classification in step S413 is completed for all the sub groups divided in step S412. If the scene classification in step S413 is not completed (No in step S414), the processing returns to step S413. If the scene classification in step S413 is completed (Yes in step S414), the processing proceeds to step S415.

In step S415, the CPU 101 sets a main character using the image score unit 210. The setting of the main character is made for an image group specified by the user and two types of settings are made, namely automatic and manual settings. In a case where the main character is automatically set, the main character is set based on the result of the individual recognition in step S410 and the result of the scene division in step S412. Based on the result acquired in step S410, the number of times the person corresponding to each individual ID appears in a sub image group, the number of times the person corresponding to each individual ID appears in each scene, and the number of scenes where the person corresponding to each individual ID appears are identified. The main character is automatically set based on these pieces of information. In the present exemplary embodiment, if a plurality of scenes are included in the image group, the individual ID of a person that appears many times in the plurality of scenes is set as a main character ID. If the image group is composed of a single scene, the individual ID of a person that appears many times in the single scene is set as a main character ID. If the user specifies a particular icon using the main character specifying unit 304, the individual ID corresponding to the selected icon is transmitted to the image score unit 210 through the main character information input unit 209. If an individual ID is specified by the user, the main character ID set by the above automatic setting is ignored, and the individual ID specified by the user is set as a main character ID. The setting thus made based on specifying using the main character specifying unit 304 is referred to as a "manual setting".

Figure 10:
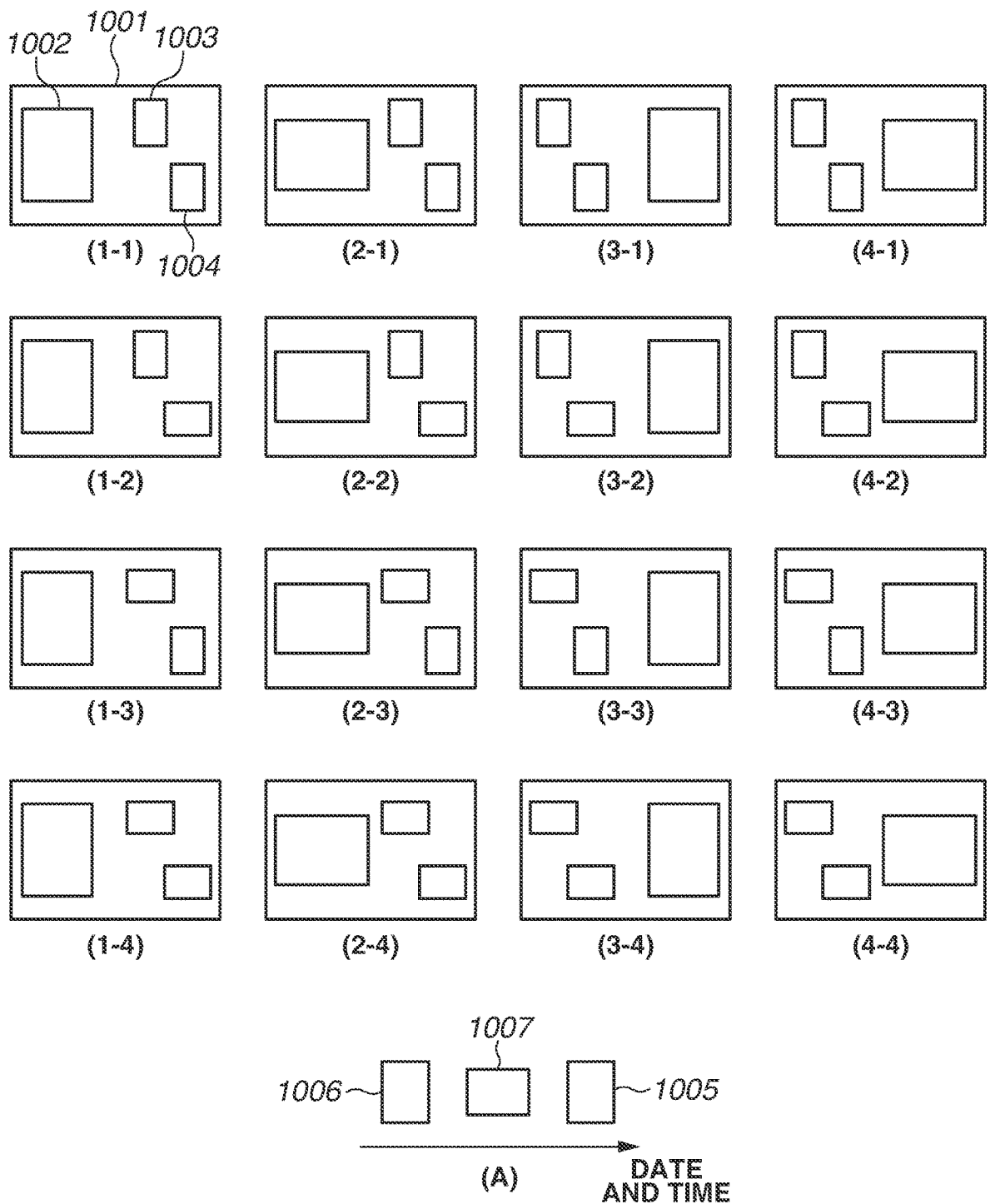
FIG. 10 is a diagram illustrating an image layout according to the present disclosure.

In step S416, the CPU 101 marks the score using the image score unit 210. A score given by the marking is a value to be referenced when image selection is performed. A score is given to each piece of image data from a viewpoint described below. Further, a score is given to moving image-clipped image, taking into account also the result of analysis by the moving image analysis unit 203. With reference to FIGS. 8 and 10, the scoring method is described.

FIG. 10 illustrates a group of templates used to lay out three images. A template 1001 illustrated in (1-1) of FIG. 10 is a single template and includes a main slot 1002 and sub slots 1003 and 1004. The main slot 1002 is a slot (a frame in which an image is laid out) in the template 1001 and is larger in size than the sub slots 1003 and 1004. That is, a "main slot" is a slot of the largest size in each template. A "sub slot" is a slot other than the main slot in each template. Both a score for the main slot and a score for the sub slot are given to each piece of image data.

Next, FIG. 8A illustrates criteria for marking the score of image data. More specifically, FIG. 8A illustrates a table summarizing the features of images that obtain high scores with respect to each scene such as a travel, a daily life, or a ceremony. As illustrated in FIG. 8A, a feature that obtains a high score differs according to the type of slot. For example, in a travel scene, a long-shot image including a person and a scenery obtains a high score as a main slot, and an image of a close-up of a face or a profile obtains a high score as a sub slot. Further, for example, in a daily life scene, an image of a close-up of a face or a profile obtains a high score as a main slot, and a long-shot image including a person and a scenery obtains a high score as a sub slot. Further, for example, in a ceremony scene, an image in which the distance between two peoples is small obtains a high score as a main slot, and an image of a large number of peoples obtains a high score as a sub slot. As described above, a feature that obtains a high score, in other words, an evaluation criterion, differs according to the type of scene and the type of slot. In the present exemplary embodiment, a feature that obtains a high score according to the type of scene and the type of slot is set in advance in the application and included in the program. A feature that obtains a high score is not limited to the above. Based on the feature of each of main and sub slots in respective scenes illustrated in FIG. 8A, the image score unit 210 marks a score of each piece of image data included in each sub image group. The number of faces, the position of a face, and the size of a face in each image are acquired, and the average values and the standard deviations of these features are calculated with respect to each type of scene and each type of slot (main and sub slots). A scene, which an image indicated by each image data of an image group specified by the user belongs to (is classified into) is identified based on the result of the scene classification in step S413. Then, based on the average values and the standard deviations corresponding to the scene of the image of interest and obtained in advance, and the feature amounts such as the number of faces corresponding to the main character ID, the position of a face, and the size of a face in the image of interest, the score and the average score are calculated using the following formulas. In the following formulas, the score, the average value, and the standard deviation are obtained with respect to each type of scene, each type of slot, and each feature amount.

The score=50−|10×(the average value−the feature amount)/the standard deviation|

The average score=(the score of the number of faces+the score of the position of a face+the score of the size of a face)/the number of feature amount items Further, based on the mode specified by the album creation condition specifying unit 201, points are added to the calculated score. In a case where the mode is set to a person, and if an image of which a category is a person is included in the top three in the object classification stored in the image analysis information in FIG. 5, points are added to the score. The higher the reliability of the result of the object classification, the more points are added to the score. Additionally, points to be added to the score may be changed according to the rank of the result of the object classification. Here, for illustrative purposes, a case is described where a person is selected as the mode. Alternatively, another mode such as an animal or food may also be selected. Further, the number of objects is not limited to one, and two or more objects may be selected. In that case, points are added to the score according to the selected objects included therein.

The image score unit 210 performs the above scoring for both main and sub slots. In this case, a focused image is more appropriate as an image for use in the album. Predetermined points may, therefore, be added to the score of image data corresponding to an image ID of which the feature amount regarding the focus illustrated in FIG. 5 is "○". Thus, the focused image can obtain a high score. FIG. 8B illustrates an example of the processing result of scoring executed on images. Scores for main and sub slots are given to each image ID.

After both scores for main and sub slots are set to the images, and if the type of image illustrated in FIG. 5 is a moving image, a score value calculated as the result of analysis by the moving image analysis unit 203 is added to both scores for main and sub slots. Here, a method for using the score value calculated by the moving image analysis unit 203 has been described. Alternatively, the score value to be added may be made large according to an amount of motion. Yet alternatively, predetermined points may be added to the score of a frame after zooming is performed by camerawork, or the score of a frame after panning is performed by camerawork. In this manner, it is possible to reflect the intention of the user when capturing a moving image.

If points are added to the score only when the moving image is captured, an image clipped from a moving image may have an advantage over a still image. In this case, the average of the score values of clipped images calculated by the moving image analysis unit 203 is calculated, and is added to the scores of all still images or subtracted from the scores of the clipped images.

Figure 15:
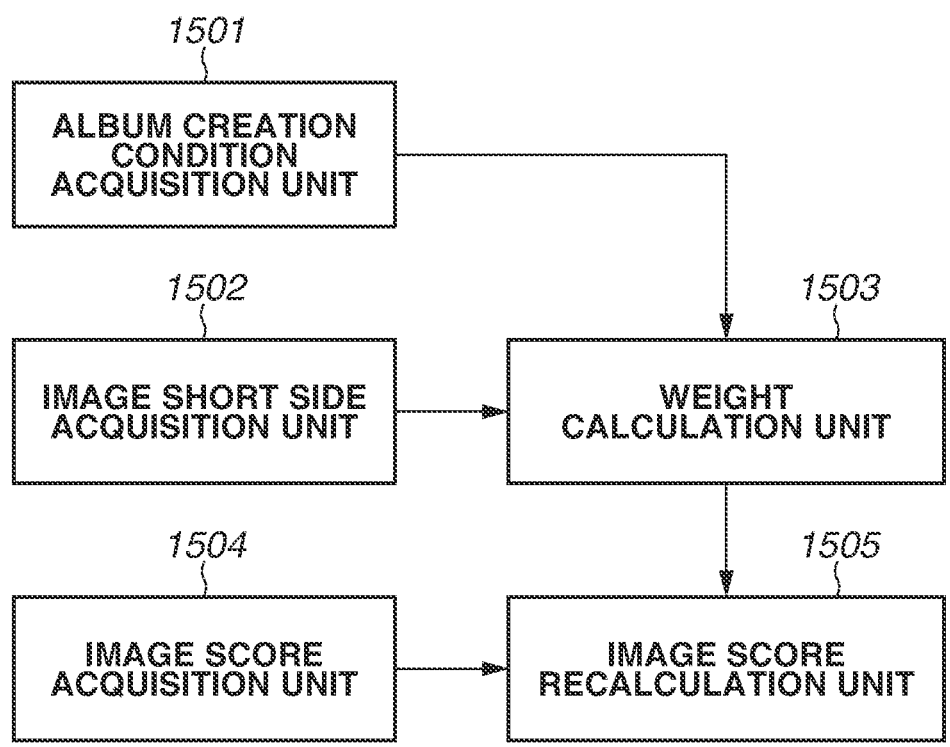
FIG. 15 is a diagram illustrating image scoring according to the present disclosure.

Further, step S416 is described in detail. Specifically, a description is given of marking the score of an image taking into account an image size. FIG. 15 is a diagram illustrating an example of an image scoring process taking into account an image size, which is executed by the image score unit 210. In the present case, for illustrative purposes, a description is given of the details of a process for calculating an image score based on the above image analysis information, image classification information, and main character information and marking the score taking into account an image size.

An album creation condition acquisition unit 1501 acquires album creation conditions specified by the album creation condition specifying unit 201. The conditions set in step S401 are acquired. In the present case, for illustrative purposes, the product size of the album to be created is acquired.

Based on an image size acquired by the image acquisition unit 205, an image short side acquisition unit 1502 acquires as short side information the smaller information between width and height. For example, based on the resolution of an acquired image and the product size in the above acquired conditions, the number of pixels on the short side of the image is determined and acquired as the short side information. In the present case, for illustrative purposes, a description is given using the short side of the image as an example. However, any scale indicating the image size, such as the area, may be used.

Figure 17:
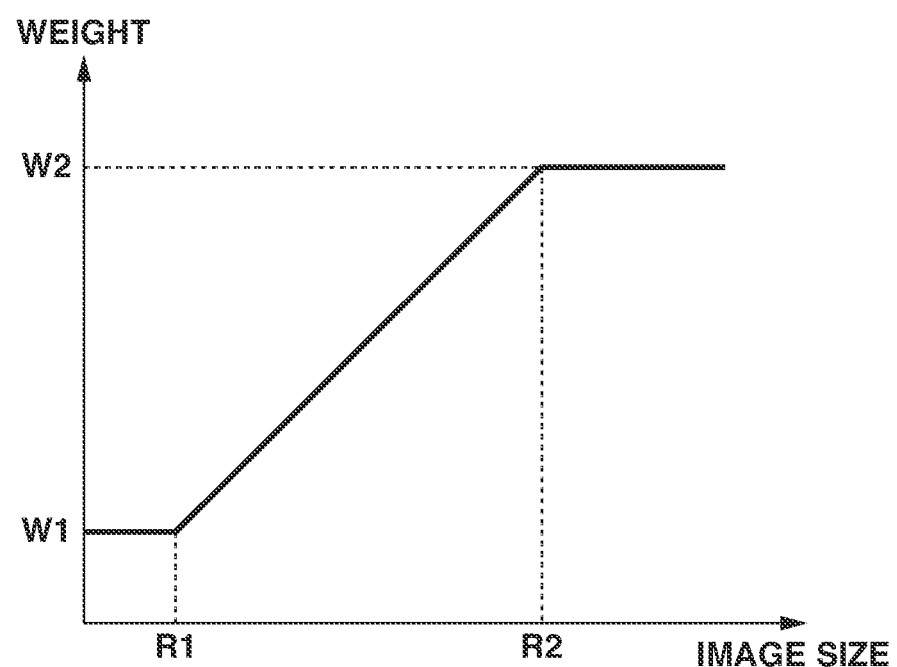
FIG. 17 is a diagram illustrating a weight for use in the image scoring according to the present disclosure.

Based on the short side of the image acquired by the image short side acquisition unit 1502, a weight calculation unit 1503 calculates a weight. FIG. 17 is a diagram illustrating the weight to be calculated from the short side of the image. The horizontal axis represents the image size (the number of pixels on the short side in the present exemplary embodiment), and the size of the short side of the image acquired by the image short side acquisition unit 1502 is used as the image size. The vertical axis represents the weight, and a corresponding weight is acquired based on the size of the short side of the image. R1 in FIG. 17 is set based on the minimum image size acceptable when the album is created. The minimum image size corresponding to R1 is held in advance in the album creation application. R2 in FIG. 17 is set based on the conditions for the album to be created. For example, according to the product size of the album specified by the user, the size of a single image when placed on the entire surface of a double-page spread based on the resolution for printing may be calculated and set as R2. R2 is thus set according to the product size, whereby it is possible to evaluate the image size according to the product. R2 may be set according to a factor influencing the size of an image when laid out other than the product size, such as the size of the largest slot included in a held template or the minimum number of images to be placed in a template.

Further, FIG. 17 indicates that W1 is used for image data in which the size of the short side of the image is less than or equal to R1, and W2 is used for image data in which the size of the short side of the image is equal to or greater than R2. In the present case, for illustrative purposes, W1 is set to 0.1, W2 is set to 1.0, R1 is set to 240, and R2 is set to 1080. From R1 to R2, the weight is set to linearly increase from W1 to W2. Based on the result of a subjective evaluation or visual characteristics, the weight may be set to non-linearly increase from W1 to W2. In this case, for illustrative purposes, a description has been given of the calculation method for calculating the weight based on the product size. Alternatively, the weight may also be changed depending on the product type.

Based on the above image analysis information, image classification information, and main character information, an image score acquisition unit 1504 acquires an image score.

An image score recalculation unit 1505 recalculates a score for the image based on the weight calculated by the weight calculation unit 1503 and the image score acquired by the image score acquisition unit 1504.

A description has been given using as an example a technique using the image size and the product size to determine an image resolution. Alternatively, in addition to the image size, image capturing information such as terminal information of a terminal having captured the image or lens information of a lens used to capture the image may be used. According to terminal information of a terminal such as a smartphone or the performance of a camera model, R2 or the slope in FIG. 17 is changed. For example, if an image group is captured by a high-performance camera, a method of enlarging the value of R1 in FIG. 17 can be adopted. The same applies to the lens information of the lens used to capture the image. Further, weighting may be changed such that an image to be adopted is changed based not only on the product size but also on a template to be used to create the album. For example, in a template design having a small blank space, a higher resolution image is desired. Thus, a method of enlarging the value of R2 in FIG. 17 can be adopted.

Further, in a case where an image to be input to the application is in a compressed format, weighting may be changed such that an image to be adopted is changed according to the compression ratio of the image to be input. For example, if the input image is a Joint Photographic Experts Group (JPEG) file, an approximate compression ratio is estimated according to a quantization table in the file header. A method of holding a quantization table with respect to each compression ratio and comparing the quantization tables to estimate an approximate compression ratio can be adopted. If the compression ratio is low, image quality deterioration is small even in a case of an image with a high resolution. That is, the weighting corresponding to R2 is enlarged so that it becomes more likely that an image with a low compression ratio is selected. If, on the other hand, the compression ratio is high, image deterioration is significant. That is, the weighting corresponding to R2 is made small so that it becomes less likely that an image with a high compression ratio is selected.

Figure 16:
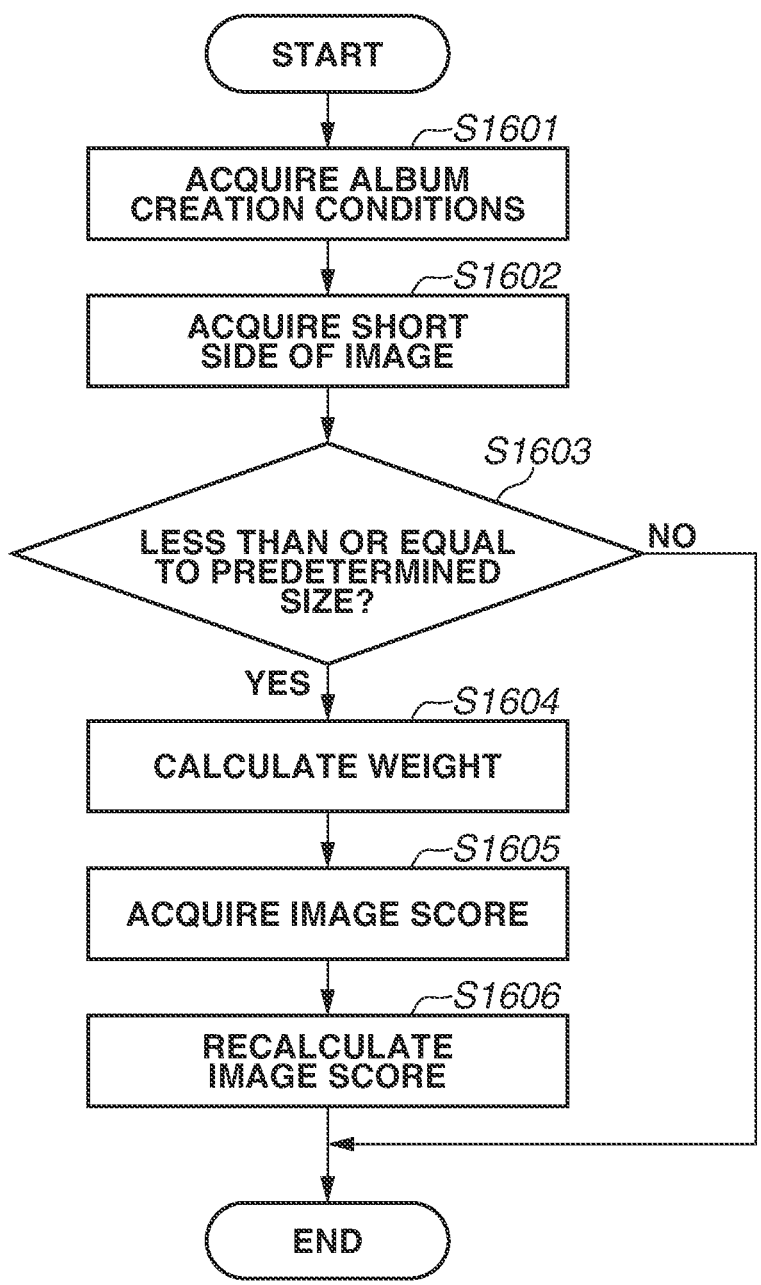
FIG. 16 is a diagram illustrating a flowchart of the image scoring according to the present disclosure.

FIG. 16 is a diagram illustrating the processing flow of the image scoring process taking into account an image size.

In step S1601, using the album creation condition acquisition unit 1501, the CPU 101 acquires the album creation conditions. One or more of the size of the album to be created, the type of the album, or the type of sheet to be used for the album is acquired.

In step S1602, the CPU 101 acquires information regarding the short side of a target image using the image short side acquisition unit 1502. Based on the width and the height of an image to be scored, the short side of the image is set. Examples of the information regarding the short side include the number of pixels on the short side. The result of calculating the number of pixels on the short side of the target image based on the resolution of the target image and the product size acquired in step S1601 is acquired in step S1602. As another form, based on the resolution of the target image and the sizes of slots in the album, the information regarding the short side may be acquired. In a case where this form is carried out, the processing in FIG. 16 is executed, whereby the target image may not be placed in a main slot, but may possibly be placed in a sub slot, which is smaller in size than a main slot.

In step S1603, the CPU 101 determines whether the short side of the image is less than or equal to a predetermined size. If the short side of the image is larger than the predetermined size (No in step S1603), the subsequent processing is not performed. Thus, a determination process for determining a weight (a coefficient) is not executed, and the processing in FIG. 16 ends. If the short side of the image is less than or equal to the predetermined size (Yes in step S1603), the processing proceeds to step S1604. For example, in step S1603, the CPU 101 determines whether the number of pixels acquired as the information regarding the short side is less than or equal to a predetermined value.

In step S1604, using the weight calculation unit 1503, the CPU 101 calculates a weight (a coefficient) for use in image scoring. For example, the number of pixels acquired in step S1602 may be applied to FIG. 17, thereby calculating the weight (the coefficient). Alternatively, as another method, a value obtained by dividing the number of pixels acquired in step S1602 by the predetermined value used in the determination in step S1603 may be used as the weight (the coefficient).

In step S1605, using the image score acquisition unit 1504, the CPU 101 acquires the score of the target image calculated based on the above image analysis information, image classification information, and main character information. In step S1606, based on the weight calculated by the weight calculation unit 1503 and the score acquired by the image score acquisition unit 1504, the CPU 101 recalculates the image score using the image score recalculation unit 1505.

This is the description of the process of calculating an image score according to an image size. Thus, the scoring of each image ends. For example, if the number of pixels on the short side of the target image is smaller than the predetermined value, the value obtained by dividing the number of pixels on the short side by the predetermined value is smaller than one. The score acquired in step S1605 is multiplied by this value that is smaller than one, thereby obtaining the score acquired in step S1605 as a smaller value. That is, it is less likely that an image having a smaller number of pixels on the short side than the predetermined value is selected. As a result, an album desired by the user can be created. In FIG. 16, a description has been given of the process for determining the weight (the coefficient) using the number of pixels on the short side of the target image. Alternatively, the weight (the coefficient) may be determined using not the number of pixels on the short side but the number of pixels of the entirety of the target image. Yet alternatively, the weight (the coefficient) may be determined using the area as adopted in the above description of the image short side acquisition unit 1502.

That is, step S423 in FIG. 4 described below will be executed using the score of the image calculated in FIG. 16. As a result, based on a target image selected from a plurality of images and pixel information of the target image identified based on the album creation conditions, the CPU 101 can specify whether the target image is to be used for the album. Further, based on the resolution of a target image selected from a plurality of images and the album creation conditions, the CPU 101 can specify whether the target image is to be used for the album.

Further, in FIG. 16, after acquiring the score of the target image in step S1605, then in step S1606, the CPU 101 recalculates the score of the target image based on the weight. An example of an effect produced by the processing in this order is described. For example, a first size is acquired as the album creation conditions acquired in step S1601, and steps S1602 to S1606 are executed, so that the score of the target image is calculated for the album of the first size. Here, if the user changes the album creation conditions from the first size to a second size different from the first size, the score of the target image acquired in step S1605 does not change, but the weight (the coefficient) calculated in step S1604 changes. That is, if the album creation conditions are changed, then based on the score of the target image determined before the album creation conditions are changed and on the changed album creation conditions, the CPU 101 specifies whether the target image is to be used for the album according to the changed conditions. Thus, even if the album creation conditions are changed, it is not necessary to calculate the score of the target image again. Thus, an efficient process can be executed. The description returns to FIG. 4. In step S417, the CPU 101 determines whether the image scoring in step S416 is completed for all the images of the image group specified by the user. If the image scoring in step S416 is not completed (No in step S417), the processing returns to step S416. If the image scoring in step S416 is completed (Yes in step S417), the processing proceeds to step S418.

In step S418, using the double-page spread assignment unit 212, the CPU 101 determines whether the number of scenes (the number of sub image groups) obtained by the scene division of the image classification unit 208 is the same as the number of double-page spreads input from the number-of-double-page-spreads input unit 211. If the numbers are not the same (No in step S418), the processing proceeds to step S419. If the numbers are the same (Yes in step S418), the processing proceeds to step S422. For example, if the number of scene divisions in FIG. 6A is eight and the number input from the number-of-double-page-spreads input unit 211 is eight, the processing proceeds to step S422.

In step S419, the CPU 101 determines whether the number of scenes obtained by the scene division is smaller than the number of double-page spreads input from the number-of-double-page-spreads input unit 211. If the number of scenes is not smaller than the number of double-page spreads (No in step S419), the processing proceeds to step S421. If the number of scenes is smaller than the number of double-page spreads (Yes in step S419), the processing proceeds to step S420. For example, if the number of scene divisions in FIG. 6A is eight and the number input from the number-of-double-page-spreads input unit 211 is ten, the number of scenes is not smaller than the number of double-page spreads. Thus, the processing proceeds to step S420.

Figure 6B:
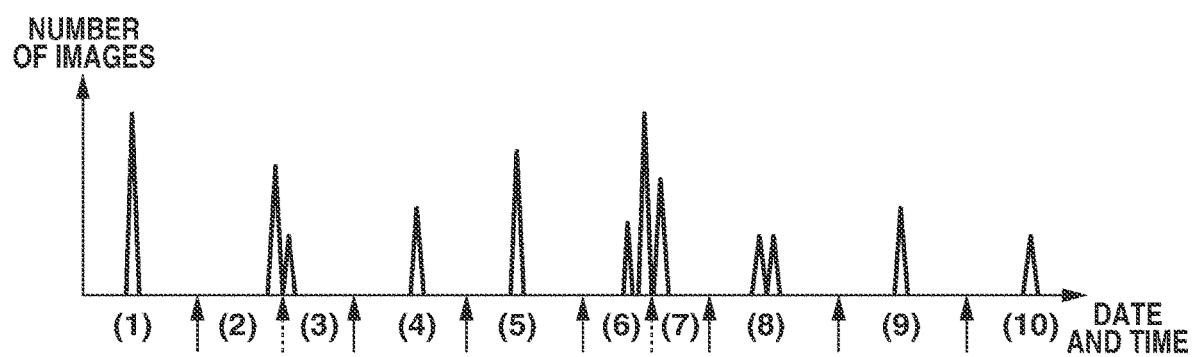

In step S420, the CPU 101 performs sub scene division using the double-page spread assignment unit 212. The "sub scene division" refers to further dividing divided scenes if the number of scene divisions<the number of double-page spreads. A description is given taking as an example a case where the number of scene divisions in FIG. 6A is eight, while the specified number of double-page spreads is ten. FIG. 6B is the result of performing the sub scene division on FIG. 6A. A sub image group is further divided at a point indicated by a dashed arrow between "6" and "7", so that the number of divisions becomes ten. Criteria for the sub scene division are the number of images and the shooting date and time. Among the divisions in FIG. 6A, a sub image group having a large number of images is identified. In the present case, to increase the number of scenes by two from eight to ten, two sub image groups having a large number of images are identified. That is, as a scene to be divided again, a scene including the largest number of images is sequentially specified. Between scenes having the same number of images, the scene having a larger maximum value of the difference in shooting date and time between the first and last images in a single scene is selected. If the scene to be divided again still cannot be determined, it may be appropriately determined in advance that, for example, the temporally earlier scene is preferentially divided again. In the example of FIG. 6A, sub image groups 5, 1, and 2 are selected in this order, from the scene including the largest number of images. In the present exemplary embodiment, if sub image groups have the same number of images, the sub image group having a greater difference in time between the first and last images included in the sub image group is divided. The sub image groups 1 and 2 have the same number of images, but the sub image group 2 has a greater difference in time between the first and last images. Thus, the sub image group 2 is selected as a division target. That is, in FIG. 6A, each of the sub image groups 5 and 2 is further divided. First, the division method for dividing the sub image group 2 is described. In the sub image group 2, the number of images has two peaks, which correspond to different shooting dates. In this case, the sub image group 2 is divided at a point where the shooting date changes (a point indicated by a dashed arrow in FIG. 6B). Next, the division of the sub image group 5 is described. In the sub image group 5, the number of images has three peaks, which correspond to different shooting dates. Also in this case, the sub image group 5 is divided at a point where the shooting date changes. In this case, although there are two points where the shooting date changes, the sub image group 5 is divided such that the difference in the number of images between the divided image groups becomes smaller. In FIG. 6B, in a case where the sub image group 5 in FIG. 6A is divided at the boundary between the second and third days, the difference in the number of images between the divided image groups is smaller than in a case where than the sub image group 5 is divided at the boundary between the first and second days. Thus, the sub image group 5 in FIG. 6A is divided at the boundary between the second and third days. That is, the sub image group 5 in FIG. 6A is divided at a point indicated by a dashed arrow in FIG. 6B. Thus, the number of divisions is changed from eight to ten. In the present case, a sub image group is divided at a point between different shooting dates. However, in a case where a sub image group having a large number of images is captured in a single day, the sub image group is divided at a point where the difference in time is the greatest in the single day.

Figure 6C:
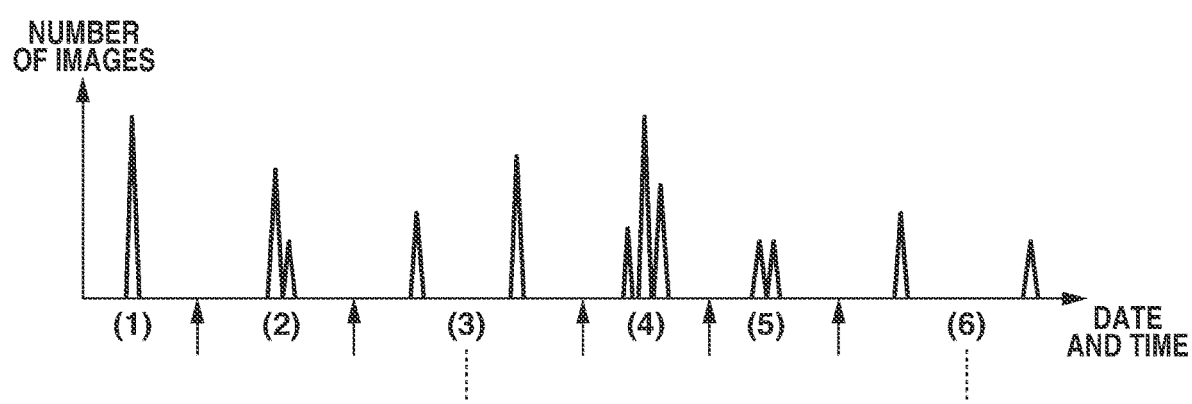

In step S421, the CPU 101 performs scene integration using the double-page spread assignment unit 212. In the "scene integration", if the number of scenes is larger than the number of double-page spreads, divided scenes (sub image groups) are integrated. Specifically, the scene integration is performed such that the number of scenes matches the number of double-page spreads. FIG. 6C illustrates a result of performing the scene integration on sub image groups 3 and 4 and sub image groups 7 and 8 in FIG. 6A in a case where the number of double-page spreads is six, thereby changing eight sub image groups to six sub image groups. The sub image groups are integrated at points indicated by dashed lines, in other words, the sub image groups are not divided at the points indicated by the dashed lines, so that the number of scenes (the number of sub image groups) becomes six. In the scene integration, sub image groups having a smaller number of images are identified. In the example of FIG. 6A, to reduce the number of divisions from eight to six (by two), sub image groups having a smaller number of images are identified. In FIG. 6A, sub image groups having a smaller number of images are the sub image groups 8, 3, and 7 in ascending order. Thus, first, the sub image group 8 is selected as an integration target. Next, the sub image groups 3 and 7 have the same number of images. However, since the sub image group 8 adjacent to the sub image group 7 is selected as an integration target, the sub image group 3 is selected as an integration target.

Next, the CPU 101 determines whether the sub image group as the integration target is to be integrated with a sub image group having earlier shooting date and time, or with a sub image group having later shooting date and time. First, the integration of the sub image group 3 in FIG. 6A is described.

In FIG. 6A, the difference in time between the sub image groups 3 and 2 is compared with the difference in time between the sub image groups 3 and 4. In this example, the difference in shooting time between the last image of the sub image group 3 and the first image of the sub image group 4 is smaller than the difference in shooting time between the first image of the sub image group 3 and the last image of the sub image group 2. In this case, the CPU 101 determines that the sub image group 3 is to be integrated with the sub image group 4. That is, the sub image groups 3 and 4 in FIG. 6A are integrated together, thereby generating a sub image group 3 in FIG. 6C.

Next, the integration of the sub image group 8 in FIG. 6A is described. Since there is no sub image group subsequent to the sub image group 8, the sub image group 8 is integrated with the sub image group 7, which precedes the sub image group 8. That is, the sub image groups 7 and 8 in FIG. 6A are integrated together, thereby generating a sub image group 6 in FIG. 6C. In the present exemplary embodiment, sub image groups having a smaller difference in shooting time are integrated together. The present disclosure, however, is not limited to this. For example, a sub image group as an integration target may be integrated with a sub image group having a smaller number of captured images.

In step S422, the CPU 101 performs double-page spread assignment using the double-page spread assignment unit 212. Through steps S418 to S421, the number of sub image groups and the specified number of double-page spreads are the same. In the present exemplary embodiment, a sub image group with the earliest shooting date and time is assigned to the first double-page spread. That is, the sub image groups are assigned to the double-page spread pages in the album in the order of shooting date and time. Consequently, it is possible to create an album in which sub image groups are arranged in the order of shooting date and time. As will be described below, within a single double-page spread page, images do not need to be arranged in the order of shooting date and time.

In step S423, the CPU 101 selects a predetermined number of images from each sub image group using the image selection unit 213. With reference to FIGS. 9A to 9I, a description is given taking as an example a case where four images are selected from a sub image group assigned to a double-page spread. In the present exemplary embodiment, a "double-page spread" refers to two pages, and the first double-page spread and the last double-page spread are single pages.

FIG. 9A illustrates the difference in time between the shooting dates and times of the first and last images included in the sub image group assigned to the double-page spread, in other words, the image capturing period of the sub image group. With reference to FIG. 9B, a description is given of a method for selecting the first image when selecting four images. A template includes a single main slot 1002. As the first image, an image for the main slot 1002 is selected. Among all the images captured in the image capturing period of the sub image group illustrated in FIG. 9B, an image having the highest score for a main slot, which is marked in step S416, is selected.

Then, at the second image and thereafter, an image for a sub slot is selected. In the present exemplary embodiment, the image capturing period of the sub image group is subdivided, and images are selected, thereby preventing some of the images in the image capturing period of the sub image group from being placed in a concentrated manner in the double-page spread. First, the CPU 101 divides the image capturing period of the sub image group into two parts as shown in FIG. 9C, thereby obtaining two image capturing sections (periods). That is, the CPU 101 divides a subdivision image capturing period into two equal parts, thereby forming two image capturing sections (grouping the subdivision image capturing period into two image capturing sections).

Next, as shown in FIG. 9D, the CPU 101 selects an image having the highest score for a sub slot, as the second image from an image capturing section from which the first image has not been selected (a section indicated by a solid line). Next, as shown in FIG. 9E, the CPU 101 divides each of the image capturing sections in FIG. 9D into two equal parts. The CPU 101 selects an image having the highest score for a sub slot, as the third image from among images captured in image capturing sections indicated by solid lines in FIG. 9F, i.e., two image capturing sections from which the first and second images have not been selected (images corresponding to the two image capturing sections).

Next, taking the selection of the fourth image as an example, a case is described where an image is not present in an image capturing section from which an image is to be selected, and an image cannot be selected. In the present exemplary embodiment, the CPU 101 divides the image capturing period according to a time, regardless of the number of images. Thus, there is a case where an image is not present in an image capturing section obtained by dividing the image capturing period. For example, suppose that as shown in FIG. 9G, the CPU 101 should select the fourth image from an image capturing section from which an image has not yet been selected (a shaded image capturing section), but an image is not present in the shaded image capturing section. In this case, as shown in FIG. 9H, the CPU 101 divides each of the image capturing sections from which the images have already been selected into two parts. Next, as shown in FIG. 9I, the CPU 101 selects an image having the highest score for a sub slot, as the fourth image from among images captured in image capturing sections indicated by solid lines from which the first to third images have not been selected.

Figure 11:
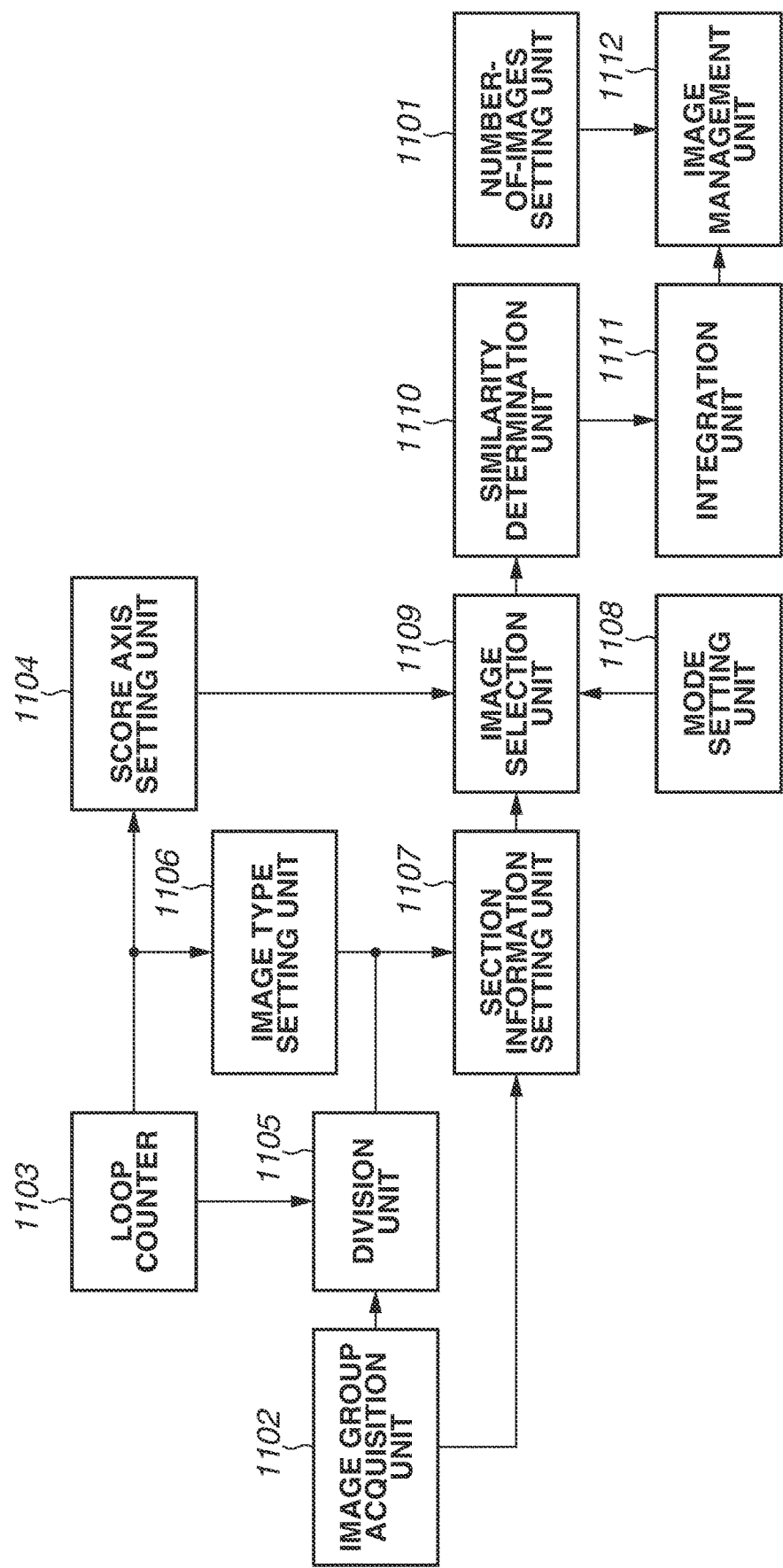
FIG. 11 is a diagram illustrating details of the image selection according to the present disclosure.

FIG. 11 is a diagram illustrating in further detail the image selection unit 213 illustrated in FIG. 2. The image selection unit 213 selects images from a sub image group assigned to a double-page spread.

A number-of-images setting unit 1101 sets the total number of images to be selected from a sub image group assigned to a double-page spread as a processing target. In other words, the number-of-images setting unit 1101 sets the number of images to be placed in a layout image on the double-page spread.

An image group acquisition unit 1102 acquires the sub image group assigned to the double-page spread from an image group acquired by the image acquisition unit 205. When the sub image group is acquired, shooting date and time information, an image type, object information, the score for a main slot, and the score for a sub slot of each image are acquired. The image type is classified into three types, namely a still image, a moving image-clipped image, and an SNS image. The present disclosure, however, is not limited to this. Alternatively, an image type other than the above three types may be differentiated. Alternatively, the still image may be differentiated in further detail, such as a still image captured by a digital camera and a still image captured by a smart device.

A loop counter 1103 manages the number of times the process of selecting an image is executed. The process of selecting an image is executed by the method described in FIGS. 9A to 9I. The managed number of times is used to determine a score axis to be used, and set how many image capturing sections the image capturing period of the sub image group assigned to the double-page spread as the processing target is to be divided into.

According to the number of times of processes counted by the loop counter 1103, a score axis setting unit 1104 sets a score axis to be used. "Sets a score axis to be used" means "setting of an evaluation criterion for an image". In this case, either of a score axis for a main slot (an evaluation criterion for a main slot) or a score axis for a sub slot (an evaluation criterion for a sub slot) corresponding to the scores for main and sub slots calculated in step S416 is set. In the present exemplary embodiment, the CPU 101 sets an evaluation criterion for each slot by switching these score axes. In this case, for example, in the first image selection, the CPU 101 executes the process of setting the score axis for a main slot and selecting a main image. At the second image selection and thereafter, the CPU 101 executes the process of setting the score axis for a sub slot and selecting a sub image. In the present exemplary embodiment, the score axis to be used has been described taking the score axis for a main slot and the score axis for a sub slot as examples. Alternatively, another score axis may be used. For example, a score axis for the degree of association with a person may be further used in addition to the score axis for a main slot and the score axis for a sub slot. The degree of association with a person is scored based on, for example, the number of times the person appears, or the number of times the person is captured together with other persons. Specifically, a higher score is marked with respect to an image including a person that appears the most frequently in a single sub image group. Further, a higher score is also marked with respect to an image including a person captured many times together with the person that appears the most frequently. Further, in the above description, score axes are switched. Alternatively, an integration score axis obtained by combining the score axis for a main slot, the score axis for a sub slot, and the score axis for the degree of association with a person may be used. In this case, the weights of the respective score axes for calculating the integration score may be changed. Further, the score axis to be used may be randomly changed according to the number of times of processes, or the score axis may be switched with reference to a table prepared in advance.

A division unit 1105 divides the image capturing period into a predetermined number of sections. First, based on the shooting time of the sub image group acquired by the image group acquisition unit 1102, the CPU 101 identifies the shooting start time and the shooting end time of the sub image group assigned to the double-page spread as the processing target, thereby calculating the image capturing period. That is, the CPU 101 identifies the shooting time of an image captured at the earliest time and an image captured at the latest time among the images included in the sub image group, thereby calculating the image capturing period. Next, based on the number of times of the processes counted by the loop counter 1103, the CPU 101 equally divides the calculated image capturing period, thereby obtaining image capturing sections. The number of divisions of the image capturing sections is set using a power of 2 based on the count. In the present exemplary embodiment, a description has been given of the method for equally dividing the image capturing period by a power of 2 based on the count. The present disclosure, however, is not limited to this. Alternatively, the image capturing period may be equally divided by the count number. Further, the division unit 1105 outputs the shooting start time and the shooting end time of each of the divided sections.

According to the number of times of the processes set by the loop counter 1103, an image type setting unit 1106 sets the type of image to be selected by image selection. In the present exemplary embodiment, the CPU 101 sets the type of image as follows. If the number of times of the processes is one, the CPU 101 selects an SNS image. If the number of times of the processes is two, the CPU 101 selects a moving image-clipped image. At the third time and thereafter, the CPU 101 selects a still image.

A section information setting unit 1107 groups the images included in the sub image group acquired by the image group acquisition unit 1102 into the sections divided by the division unit 1105 and stores information of each section, such as image capturing information of each image and the score of each image.

A mode setting unit 1108 sets the mode specified by the album creation condition specifying unit 201. The mode setting unit 1108 performs the subsequent processing so that an object corresponding to the set mode is arranged.

Based on the score axis set by the score axis setting unit 1104, the mode set by the mode setting unit 1108, and the score of each image set by the section information setting unit 1107, an image selection unit 1109 selects from each section a single image including an object corresponding to the mode and having a high score. As described with reference to FIGS. 9A to 9I, an image is not selected from a section where no image is present. In the present exemplary embodiment, a single image is selected from each section. Alternatively, the CPU 101 may select a plurality of images from each section. An image including an object corresponding to the set mode is determined based on, as a determination condition, whether a desired object is included in the top three in the object classification of the analyzed images illustrated in FIG. 5. Alternatively, another condition may be used.

A similarity determination unit 1110 determines the degree of similarity between the selected image and an image selected in the previous counter with respect to each section. If the degree of similarity is equal to or greater than a determination threshold, the CPU 101 determines that the images are similar to each other. If the degree of similarity is less than the determination threshold, the CPU 101 determines that the images are not similar to each other. If it is determined that the image selected in the previous counter is not similar to the image selected from the section of interest, the image selected from the section of interest is held. If, on the other hand, it is determined that the image selected in the previous counter is similar to the image selected from the section of interest, the image selected from the section of interest is discarded. The degree of similarity can be determined using pattern matching or a shift method. The determination threshold used to determine the degree of similarity is changed according to the difference in shooting time between images to be compared. For example, if the determination result of the similarity is output in the range of 0 to 100, the closer to 100, the more similar. If the degree of similarity is equal to or greater than the determination threshold, it is determined that the images are similar to each other. If the degree of similarity is less than the determination threshold, it is determined that the images are not similar to each other. If the difference in shooting time is small (e.g., within 15 seconds) due to consecutive capturing, the determination threshold is set low (e.g., set to 60). In other cases, the determination threshold is set to 80. If the determination threshold is set low, it is likely that images are determined to be similar to each other. Thus, even if images are slightly similar to each other, the images are determined as similar images, and the selection image is canceled. In the present exemplary embodiment, a determination criterion is thus changed according to the difference in shooting time.

An integration unit 1111 selects an image to be ultimately left, from the images in the sections that are not similar according to the determination of the similarity determination unit 1110. That is, using the integration unit 1111, the CPU 101 determines an image to be left, which is in a certain section, in a case where images are selected from a plurality of sections. When determining the image to be left, the CPU 101 uses the score used in the determination by the image selection unit 1109 to select an image having a high score. While in the present exemplary embodiment, an image having a high score is selected, the present disclosure is not limited to this. Alternatively, for example, the image may be selected from, among sections from which images have been selected, a section adjacent to a section from which an image has not been selected.

An image management unit 1112 adds as the selection image the image selected by the integration unit 1111 and determines whether the number of images set by the number-of-images setting unit 1101 is exceeded. If the number of images is reached, this image selection process ends. If the number of images is not reached, the loop counter 1103 is counted up, and the image selection process is executed again.

In the present case, for illustrative purposes, a description has been given using an example where images including the same object are selected as main and sub images. Alternatively, different objects may be selected for main and sub images. For example, when the loop count is one, a main image is selected. Thus, an object to be selected is switched between when the loop count is one and when it is not one, so that it is possible to select different objects for main and sub images.

Figure 12:
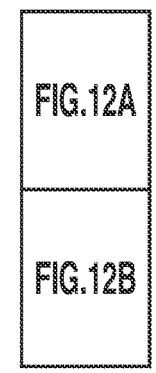
FIG. 12, which includes
Figure 12A:
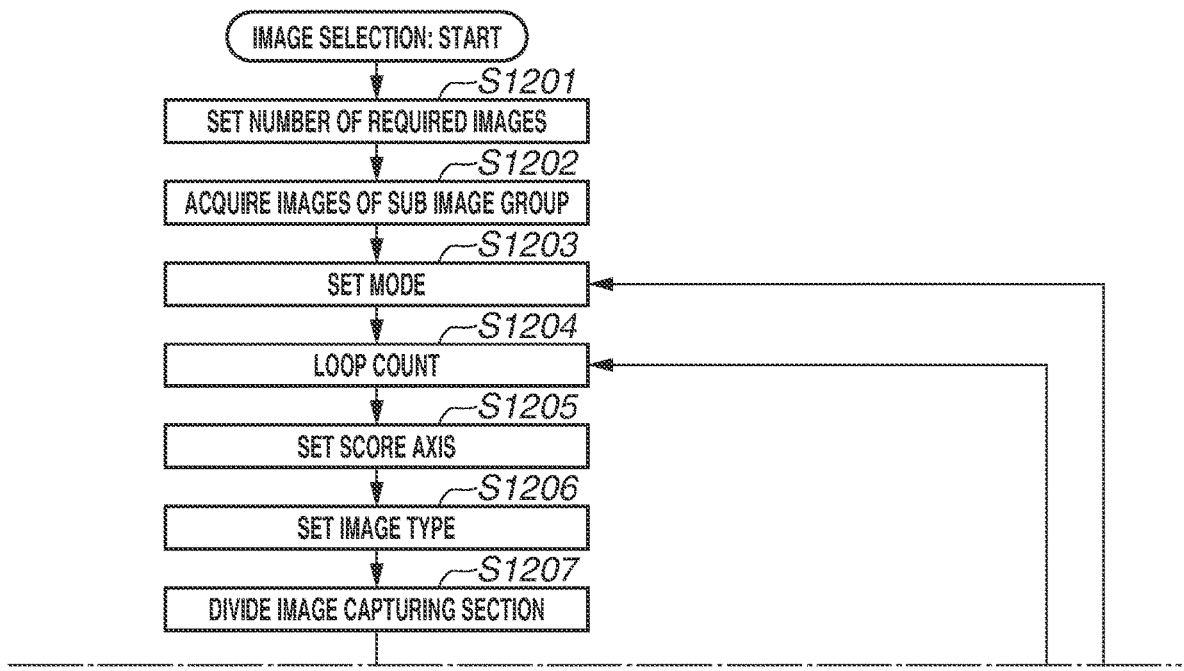
FIGS. 12A and 12B, is a diagram illustrating a flowchart of the details of the image selection according to the present disclosure.
Figure 12B:
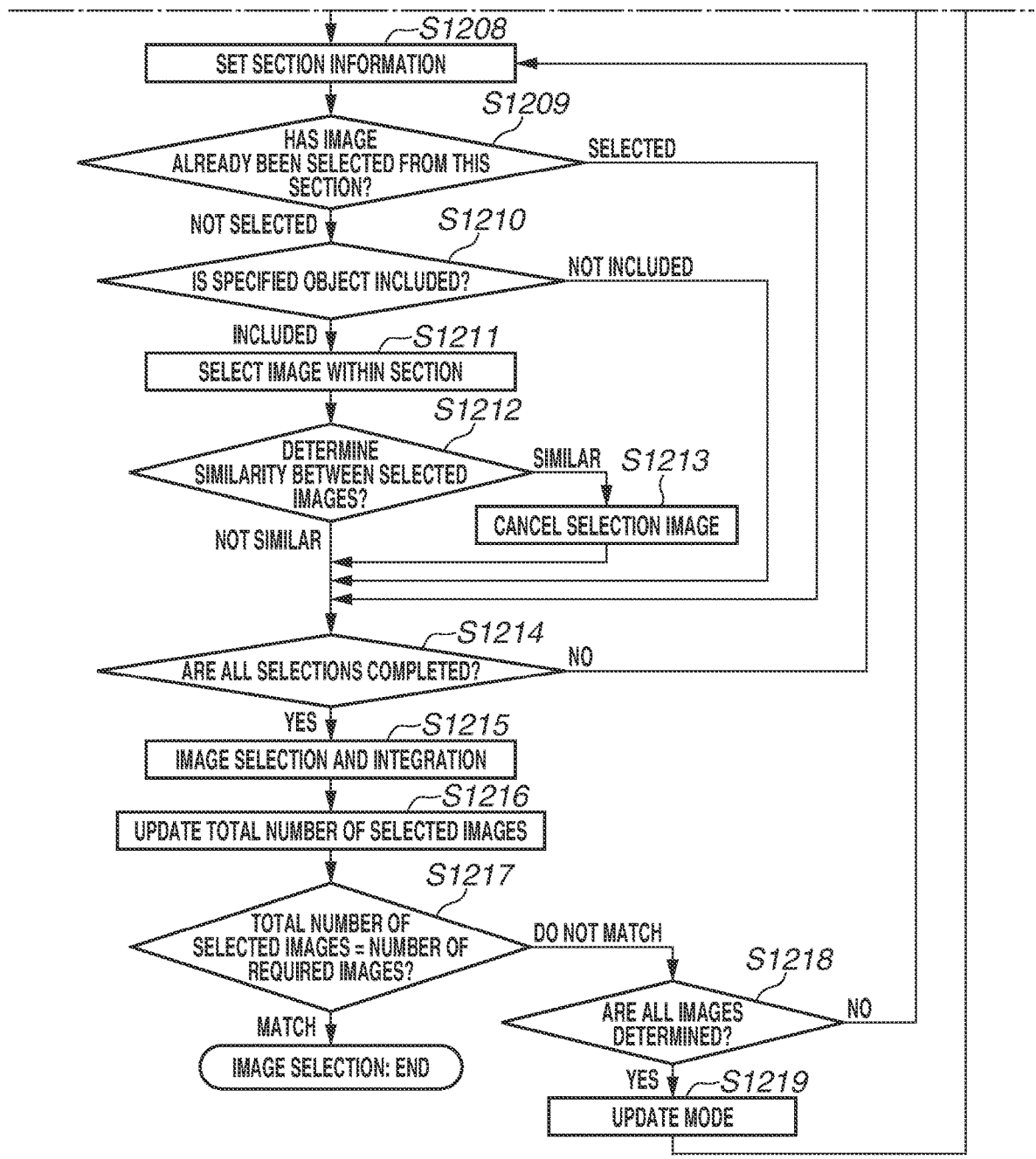

FIG. 12, which includes FIGS. 12A and 12B, is a diagram illustrating the details of the processing flow of the image selection in step S423 in FIG. 4. A description is given of the detailed flow of the process for selecting images from a sub image group assigned to a double-page spread as a processing target.

In step S1201, using the number-of-images setting unit 1101, the CPU 101 sets the total number of images to be selected from the sub image group assigned to the double-page spread as the processing target. For example, the total number of images may be set according to the page number of the double-page spread which is the current target. For example, if the double-page spread is on the first page, four images are set. If the double-page spread is on the second page, two images are set. These numbers are merely examples, and another number may be set.

In step S1202, using the image group acquisition unit 1102, from image data of an image data group acquired by the image acquisition unit 205, the CPU 101 acquires image data corresponding to the sub image group (sub image data group) assigned to the double-page spread as the processing target.

In step S1203, the CPU 101 sets the mode using the mode setting unit 1108. The "mode" is a "person" or an "animal" illustrated in FIG. 3. That is, in step S1203, the mode is set, which is selected using the display screen 301 in FIG. 3.

In step S1204, using the loop counter 1103, the CPU 101 increments the number of times that the process of selecting an image is executed. In an initial state, the process of selecting an image is not executed. Thus, 0 is set.

In step S1205, using the score axis setting unit 1104, the CPU 101 sets a score axis to be used. In the present exemplary embodiment, the score axis to be used is set according to the number of times of the image selection processes managed by the loop counter 1103.

In step S1206, the CPU 101 sets an image type to be selected by the image type setting unit 1106. In the present exemplary embodiment, if the loop count is one, i.e., if the number of times of the processes is one, an SNS image is set as the image type. Further, if the loop count is two, moving image-clipped image is set as the image type.

In step S1207, using the division unit 1105 and based on the shooting start time and the shooting end time of the sub image group assigned to the double-page spread as the processing target, the CPU 101 calculates the image capturing period of the sub image group. Then, based on the number of times of the processes counted by the loop counter 1103, the CPU 101 divides the image capturing period of the sub image group into a plurality of sections. In the first loop, the process is not executed, and therefore, the image capturing period is not divided (FIGS. 9A and 9B).

In step S1208, the CPU 101 sequentially switches a section of interest. Using the section information setting unit 1107, the CPU 101 groups the image data of the sub image group into each divided section and acquires image capturing information of each image and the score of each image with respect to each section. The score of each image acquired in step S1208 corresponds to the score calculated by executing the processing flow illustrated in FIG. 16.

In step S1209, the CPU 101 determines whether an image has already been selected from the section of interest divided by the division unit 1105. If the section of interest is a section from which an image has already been selected ("selected" in step S1209), the processing proceeds to step S1214. If the section of interest is a section from which an image has not yet been selected ("not selected" in step S1209), the processing proceeds to step S1210. In the first loop, sections are not divided, and therefore, the number of sections of interest is one.

In step S1210, the CPU 101 determines whether an image including an object corresponding to the mode set in step S1203 is included in the section of interest. If an image including the object corresponding to the set mode is not included ("not included" in step S1210), the processing proceeds to step S1214. If an image including the object corresponding to the set mode is included ("included" in step S1210), the processing proceeds to step S1211.

In step S1211, using the image selection unit 1109, the CPU 101 selects from the section of interest a single image including the object corresponding to the mode set in step S1203 and having the highest score.

In step S1212, using the similarity determination unit 1110, the CPU 101 determines the degree of similarity between the image selected from the section of interest and the image selected according to the previous counter. If it is determined that the images are not similar to each other ("not similar" in step S1212), the image selected from the section is held, and the processing proceeds to step S1214. If it is determined that the images are similar to each other ("similar" in step S1212), then in step S1213, the image selected from the section is canceled, and the processing proceeds to step S1214.

In step S1214, the CPU 101 determines whether the process of selecting an image is executed on all the sections divided in step S1207. If the process has been executed on all the sections (Yes in step S1214), the processing proceeds to step S1215. If the process has not been executed on all the sections divided in step S1205 (No in step S1214), the processing returns to step S1208. In S1208, the CPU 101 performs the image selection on a section that has not yet been selected in the image selection.

In step S1215, using the integration unit 1111, the CPU 101 selects an image to be ultimately left, from the images in the sections that are not similar according to the determination of the similarity determination unit 1110. That is, if two or more images are left in steps S1209 to S1214, an image to be left is selected in step S1215. The selection method has been described with reference to FIG. 11, and therefore is not described here.

In step S1216, using the image management unit 1112, the CPU 101 adds the selected image to selection images, thereby updating the total number of selected images.

In step S1217, the CPU 101 determines whether the total number of selected images managed by the image management unit 1112 matches the number of images set by the number-of-images setting unit 1101. If the number of images matches the total number of selected images ("match" in step S1217), the image selection process on the double-page spread as the processing target ends. If the total number of selected images is less than the number of images ("do not match" in step S1217), the processing proceeds to step S1218.

In step S1218, the CPU 101 determines whether all the images included in the sub image group are determined in the specified mode. If not all the images included in the sub image group have been determined (No in step S1218), the processing returns to step S1204. In step S1204, the image selection process continues. At this time, the counter managed by the loop counter 1103 is incremented by one, and as a result, the division unit 1105, which works with the loop counter 1103, sets twice as many sections as the previous time. Since the sections are more minutely divided, the ranking according to the scores of images in a section changes. Thus, the CPU 101 can select an image that has not been selected in the selection process performed one loop before. If all the images have been determined in step S1218 (Yes in step S1218), the processing proceeds to step S1219.

In step S1219, even if all the images have been determined, when an image corresponding to the specified mode is not present, the CPU 101 updates the specified mode to a different mode. The update method may be priority order determined in advance, or the mode may be set based on an object in an image included in the sub image group. Then, after the mode is updated, the processing returns to step S1203. In step S1203, the updated mode is set again, and the processes of step S1204 and after that are executed.

Referring back to FIG. 4, in step S424, using the template setting unit 214, the CPU 101 sets a plurality of templates for use in a layout picked from the HDD 104. As the templates to be set, templates corresponding to a design specified by the album creation condition specifying unit 201 are set.

In step S425, using the image layout unit 215, the CPU 101 determines the image layout of the double-page spread as the processing target. The template setting unit 214 determines from among the plurality of set templates a template suitable for laying out the selected images. The method for determining the template is described with reference to FIG. 13.

Figure 13:
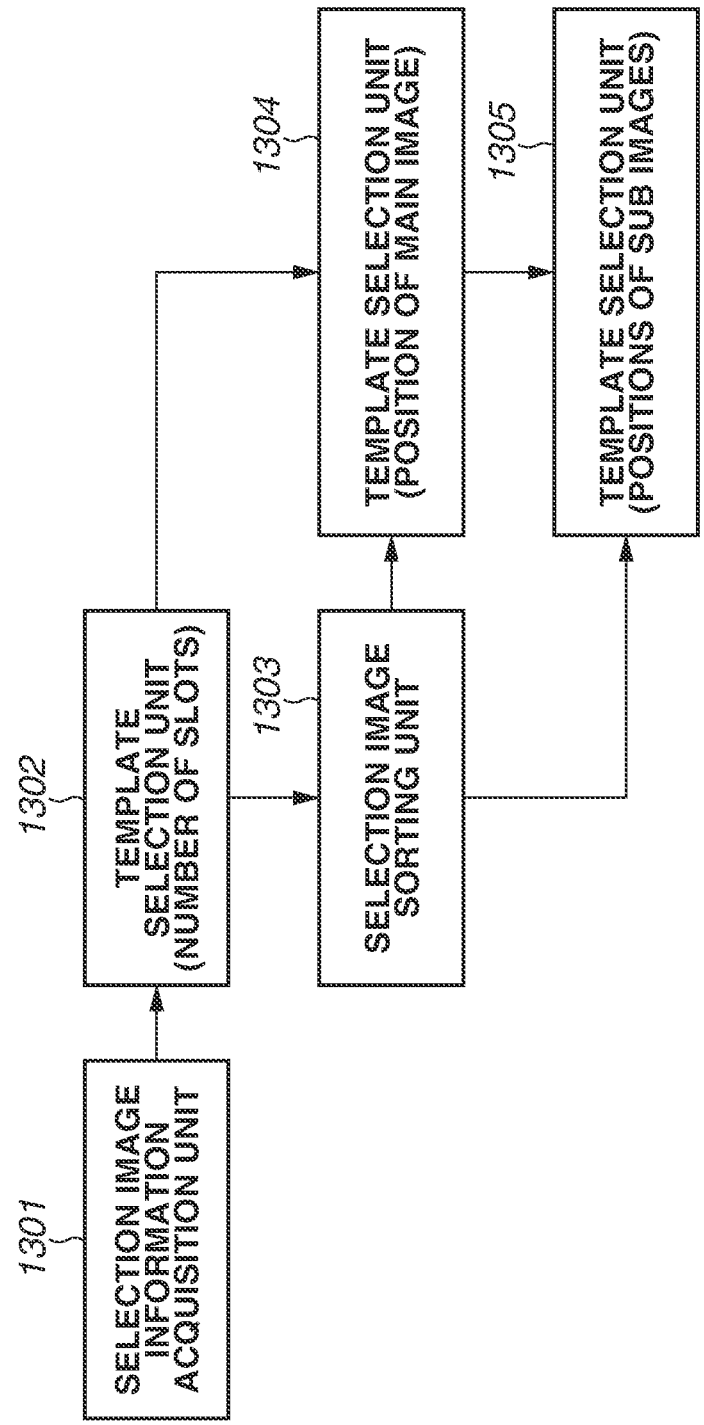
FIG. 13 is a diagram illustrating details of the image selection according to the present disclosure.

FIG. 13 is a block diagram illustrating the template determination.

A selection image information acquisition unit 1301 acquires the number of images selected by the image selection unit 213 and information regarding the images. The image information to be acquired is the width and the height of each image, shooting date and time, and the score calculated by the image score unit 210.

A template selection unit 1302 selects, from among the templates set by the template setting unit 214, templates having the number of slots that matches the number of selection images.

A selection image sorting unit 1303 sorts the selection images in the order of shooting date and time.

A template selection unit 1304 selects, among the templates selected by the template selection unit 1302, templates based on a main slot in which a main image is to be placed. The details of the selection will be described below in step S1404 in FIG. 14. Further, in the present exemplary embodiment, an image with older shooting date and time is laid out at the upper left of each template, and an image with newer shooting date and time is laid out at the lower right of the template.

A template selection unit 1305 selects, among the templates selected by the template selection unit 1304, templates based on sub slots in which sub images are to be placed. The details of the selection will be described below in step S1405 in FIG. 14.

Figure 14:
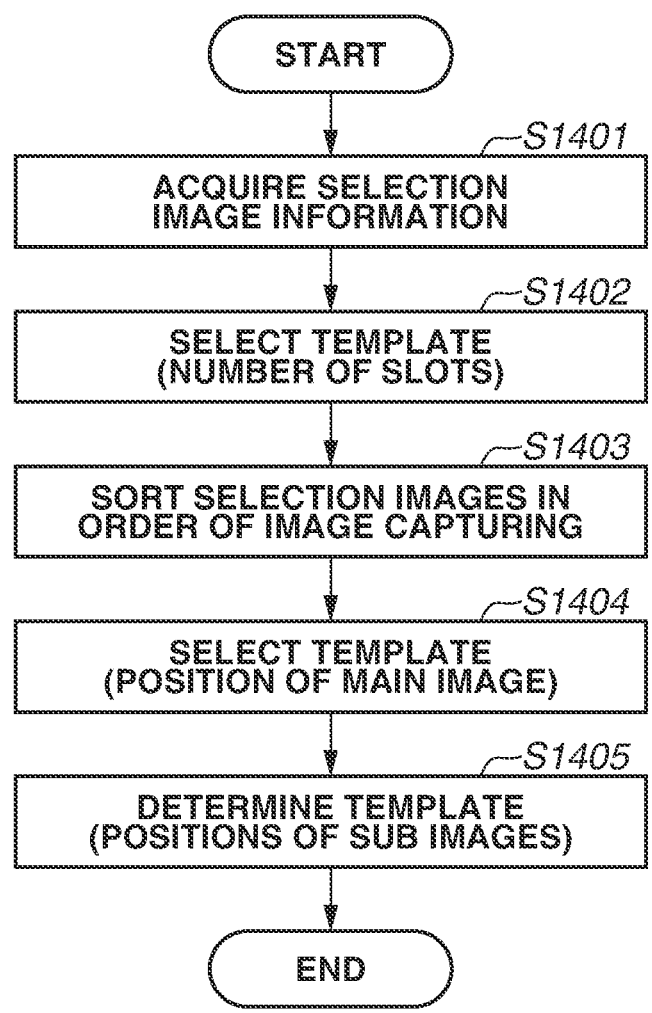
FIG. 14 is a diagram illustrating a flowchart of the details of the image selection according to the present disclosure.

FIG. 14 is a processing flowchart of the template determination.

In step S1401, using the selection image information acquisition unit 1301, the CPU 101 acquires selection image information. In the present case, the number of selection images is three. That is, information of the images selected by the processing flow in FIG. 12 is acquired. In FIG. 14, for illustrative purposes, information of three images 1005 to 1007 in FIG. 10 is acquired.

In step S1402, using the template selection unit 1302, the CPU 101 selects a template in which the number of selection images coincides with the number of slots. In the present case, a template in which the number of slots is three is selected. As an example, a description is given using the templates illustrated in (1-1) to (4-4) in FIG. 10.

In step S1403, using the selection image sorting unit 1303, the CPU 101 arranges the selection images in the order of shooting time. Suppose that the result of arranging the selection images in the order of shooting date and time is the images 1005 to 1007 in (A) in FIG. 10. In this case, the image 1005 is an image selected for a main slot, and the images 1006 and 1007 are images selected for sub slots.

In step S1404, the CPU 101 selects a template in which the placement order of a main image coincides with the position of a main slot when the selection images are arranged in the order of image capturing by the template selection unit 1304, and the aspect ratios of the main image and the main slot coincide with each other. The image 1005 is an image with the newest shooting date and time and for a main slot. Thus, the templates illustrated in (3-1) to (3-4) in FIG. 10 are candidates.

In step S1405, using the template selection unit 1305, the CPU 101 selects a template in which the positions of sub images and sub slots and the aspect ratios coincide with each other. In this example, the older image 1006 for a sub slot, i.e., an image to be placed at the upper left is a vertical image. The newer image 1007 is a horizontal image. Thus, the template illustrated in (3-2) is selected as the most suitable template for the selected images. As described above, in step S425, a template for use in a layout, images to be laid out, and slots of the template in which the images are to be laid out are determined.

In step S426, using the image correction unit 217, the CPU 101 corrects an image. If "on" is input to the image correction condition input unit 216, an image is corrected. In the present exemplary embodiment, as the image correction, dodging correction, red-eye correction, and contrast correction are performed. If "off" is input to the image correction condition input unit 216, an image is not corrected. That is, after step S425, the processing does not proceed to step S426, and step S427 is executed. The image correction is turned on or off with respect to an image to be corrected in which the number of pixels is 1200 pixels on the short side and which is converted into the sRGB color space.

In step S427, using the layout information output unit 218, the CPU 101 creates layout information. That is, according to the content determined in step S425, the CPU 101 lays out the images in the slots of the selected template. At this time, magnifications of the images to be laid out are changed according to size information of the slots of the template. The images to be used at this time are the images acquired in step S406 and are images different from the analysis images generated in step S407. Then, bitmap data in which the images are laid out on the template is generated.

In step S428, the CPU 101 determines whether steps S423 to S427 are executed on all the double-page spreads. If steps S423 to S427 are not completed (No in step S428), the processing returns to step S423. If steps S423 to S427 are completed (Yes in step S428), the automatic layout process illustrated in FIG. 4 ends.

In the present exemplary embodiment, image scoring is performed based on an image resolution (mainly, the number of pixels on the short side), and an image to be placed in an album is changed based on a set score, whereby it is possible to execute a layout process taking into account the image resolution.

In a second exemplary embodiment, a description is given of a technique, which takes into account an image resolution when image selection is performed.

Figure 18:
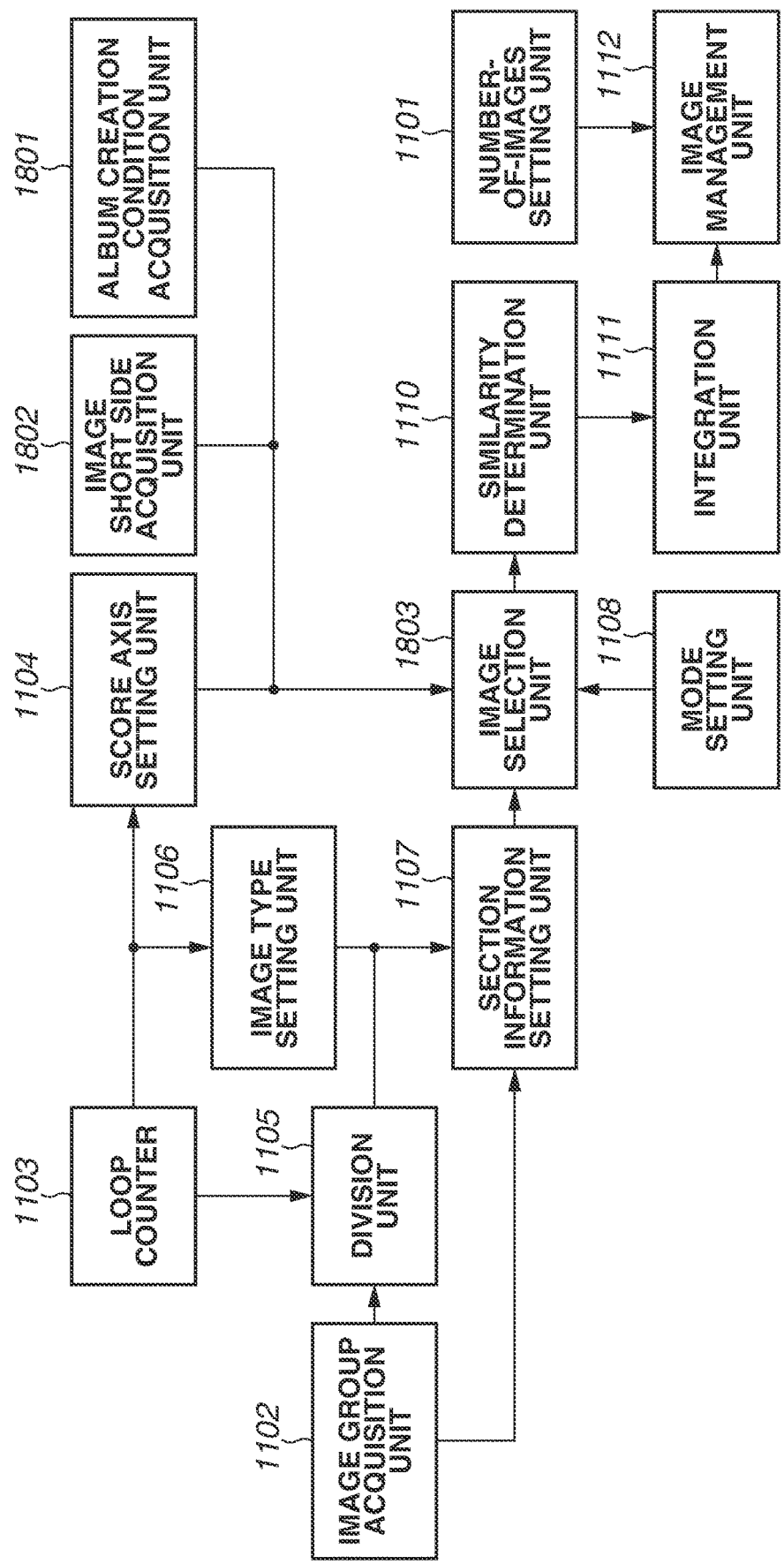
FIG. 18 is a diagram illustrating image selection according to the present disclosure.

FIG. 18 is a diagram illustrating the configuration of software for executing image selection taking into account the resolution. Components designated by the same numbers as those in FIG. 11 are not described here.

An album creation condition acquisition unit 1801 acquires album creation conditions specified by the album creation condition specifying unit 201. In the present case, for illustrative purposes, the product size of the album to be created is acquired. Based on an image size acquired by the image acquisition unit 205, an image short side acquisition unit 1802 acquires as the short side the smaller information between width and height. In the present case, for illustrative purposes, a description is given using the short side of the image as an example. However, any scale indicating the image size, such as the area, may be used.

An image selection unit 1803 executes a selection process for selecting an image. For this selection process, the score axis set by the score axis setting unit 1104, the mode set by the mode setting unit 1108, the score of the image set by the section information setting unit 1107, the product size information set by the album creation condition acquisition unit 1801, and the short side information of the image are used. That is, based on the short side of the image acquired by the image short side acquisition unit 1802, the image selection unit 1803 selects from each section a single image that is equal to or greater than a predetermined short side size, includes an object corresponding to the mode, and has a high score. Further, also in the present exemplary embodiment, as the short side information of the image, the resolution of a target image and the number of pixels on the short side of the target image obtained from the product size information are used.

Figure 19B:
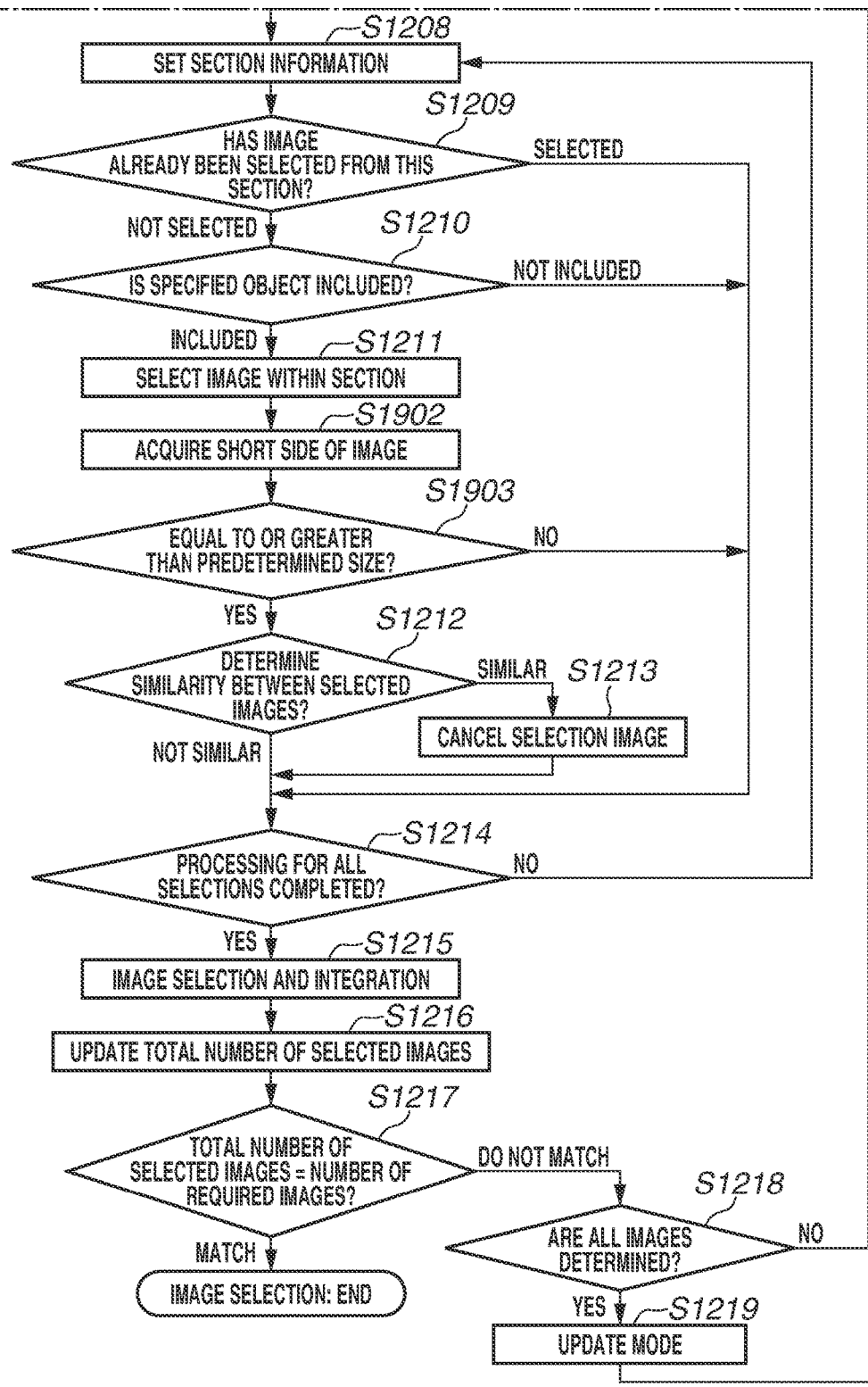

FIG. 19, which includes FIGS. 19A and 19B, is a flowchart illustrating the process of selecting images from a sub image group assigned to a double-page spread as a processing target according to the second exemplary embodiment. Processes designated by the same numbers as those in FIG. 12 are not described here.

In step S1901, using the album creation condition acquisition unit 1801, the CPU 101 acquires the album creation conditions specified by the album creation condition specifying unit 201.

In step S1902, using the image short side acquisition unit 1802, the CPU 101 acquires as the short side the smaller information between width and height of the image selected in step S1211.

In step S1903, based on the product size specified by the album creation condition specifying unit 201, the CPU 101 sets an image size (the number of pixels in the present exemplary embodiment), as a predetermined size. For example, as described above, in step S1903, according to the product size of the album specified by the user, the size (e.g., the number of pixels) of a single image when placed on the entire surface of a double-page spread is set based on the resolution for printing. Then, in step S1903, based on the set image size, the CPU 101 determines whether the image selected in step S1211 is an image equal to or greater than the predetermined size. For example, the CPU 101 determines whether the number of pixels on the short side of the target image is equal to or greater than the number of pixels set in step S1903. If the image selected in step S1211 is equal to or greater than the predetermined size (Yes in step S1903), the processing proceeds to step S1212. If, on the other hand, the short side information of the target image selected in step S1211 is less than the predetermined size (if the number of pixels on the short side of the target image is less than the predetermined value) (No in step S1903), the target image is eliminated from a selection target, and the processing proceeds to step S1214. As the predetermined size, a value set in advance with respect to each product size may be set. Furthermore, the predetermined size may be set with respect to each product size according to the resolution to print the album. Further, the image size to be set may be changed according to not only the product size but also the product type.

A description has been given using as an example a technique for using the short side information to determine whether to select the target image, after a target image is selected in step S1211. Alternatively, when image selection is performed, the image size may be taken into account. At this time, conditions for the image size to be selected may be changed according to the product size or the product type.

Further, a description has been given using as an example a technique using the image size and the product size to determine an image resolution. Alternatively, similarly to the first exemplary embodiment, instead of the image size, image capturing information such as terminal information of a terminal having captured the image or lens information of a lens used to capture the image may be used. For example, in step S1903, it may be determined whether the image has been captured using a terminal that does not satisfy a certain function. If it is determined that the image has been captured using a terminal that does not satisfy a certain function, the target image may be eliminated from a selection target. Further, conditions for an image to be adopted may be changed based not only on the product size but also on a template to be used to create the album. For example, based on the slot sizes of the template and the resolution of the target image, the number of pixels on the short side of the target image may be calculated, and step S1903 may be executed using the calculated number of pixels and predetermined sizes determined based on the slot sizes.

Further, in a case where an image to be input to the application is in a compressed format, an image to be adopted may be changed according to the compression ratio of the image to be input. For example, if the input image is a JPEG file, an approximate compression ratio is estimated according to a quantization table in the file header. For example, in step S1903, it is determined whether the compression ratio of the target image is higher than a predetermined value. If it is determined that the compression ratio is lower than the predetermined value, the processing may proceed to step S1212. If it is determined that the compression ratio is higher than the predetermined value, the target image may be eliminated from a selection target, and the processing may proceed to step S1214. In the present exemplary embodiment, image selection is performed based on an image resolution, whereby it is possible to execute a layout process taking into account the image resolution.

Other Exemplary Embodiments

The present disclosure is not limited to the above exemplary embodiments. For example, the above exemplary embodiments have been described taking an album creation application as an example. Alternatively, the above exemplary embodiments may be carried out by an application or an information processing apparatus including an image selection process for automatically selecting a recommended image.

Further, in FIG. 1, a description has been given taking an information processing apparatus in which a local environment is assumed as an example. The information processing apparatus, however, is not limited to this. For example, the above exemplary embodiments may be carried out by an information processing apparatus running on a server. In the above exemplary embodiments, images are photographs and are grouped based on the shooting dates and times. Alternatively, images may be grouped based on the dates and times when the images are created.

In the above exemplary embodiments, a user specifies a mode, and images are laid out based on the specified mode. Alternatively, an image group to be used to create an album may be subjected to image analysis, and a mode may be automatically set based on the distribution of the types of objects included in the image group.

The present disclosure can be achieved also by performing the following process. Software (a program) for achieving the functions of the above exemplary embodiments is supplied to a system or an apparatus via a network or various recording media, and a computer (or a CPU or a microprocessor unit (MPU)) of the system or the apparatus reads and executes the program. Further, the program may be executed by a single computer, or may be executed by the cooperation of a plurality of computers. Further, not all the above processing needs to be achieved by software, and part or all of the processing may be achieved by hardware.

The present disclosure provides technological improvements or unconventional solutions in advancements and/or improvements in information processing technology through use of specific manners of use with specific limitations on available data and configurational states.

According to the present disclosure, it is possible to provide a satisfactory photo book or album for a user.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors and/or one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-193776, filed Oct. 3, 2017, which is hereby incorporated by reference herein in its entirety.

What is claimed is:

1. An information processing apparatus comprising:
at least one processor configured to function as:
a discouraging unit configured to perform discouraging processing to discourage selection of a target image in a case where a number of pixels indicated by pixel information of the target image selected from a plurality of images is smaller than a predetermined value for the discouraging processing;
a specifying unit configured to specify an image to be used for an album from a plurality of images including the target image of which the selection is discouraged by the discouraging unit;
a score determination unit configured to determine a score of the target image;
a setting unit configured to set a template; and
a generation unit configured to generate layout information based on the image specified by the specifying unit and on the set template,
wherein the discouraging unit determines a coefficient to discourage selection of the target image in a case where a number of pixels of the target image selected from a plurality of images is smaller than a predetermined value for the discouraging processing;
wherein based on the score of the target image and the coefficient, the specifying unit specifies whether the target image is to be used for the album, and
wherein in a case where the number of pixels indicated by the pixel information of the target image is less than or equal to the predetermined value, the discouraging unit determines a value smaller than 1 as the coefficient for the target image, and in a case where the number of pixels indicated by the pixel information of the target image is not less than or equal to the predetermined value, the discouraging unit does not execute the discouraging processing for determining the coefficient.

2. The information processing apparatus according to claim 1, wherein based on one or more of an object or image quality of the target image, or also based on the pixel information, the specifying unit specifies whether the target image is to be used for the album.

3. The information processing apparatus according to claim 1, wherein the at least one processor is further configured to function as an acquisition unit configured to acquire a creation condition for creating an album,
wherein the pixel information of the target image is determined based on the creation condition and a resolution of the target image.

4. A control method executed by an information processing apparatus, the control method comprising:
performing discouraging processing to discourage selection of a target image in a case where a number of pixels indicated by pixel information of the target image selected from a plurality of images is smaller than a predetermined value for the discouraging processing;
specifying an image to be used for an album from a plurality of images including the target image of which the selection is discouraged;
determining a score of the target image;
setting a template; and
generating layout information based on the image specified by the specifying and on the set template,
wherein the discouraging determines a coefficient to discourage selection of the target image in a case where a number of pixels of the target image selected from a plurality of images is smaller than a predetermined value for the discouraging processing;
wherein based on the score of the target image and the coefficient, it is specified whether the target image is to be used for the album, and
wherein in a case where the number of pixels indicated by the pixel information of the target image is less than or equal to the predetermined value, a value smaller than 1 as the coefficient for the target image is determined, and in a case where the number of pixels indicated by the pixel information of the target image is not less than or equal to the predetermined value, the discouraging processing for determining the coefficient is not executed.

5. The control method according to claim 4, wherein based on one or more of an object or image quality of the target image, and also based on the pixel information, it is specified whether the target image is to be used for the album.

6. The control method according to claim 4, further comprising acquiring a creation condition for creating an album,
wherein the pixel information of the target image is determined based on the creation condition and a resolution of the target image.

7. A control method executed by an information processing apparatus, the control method comprising:
performing discouraging processing to discourage selection of a target image in a case where a number of pixels indicated by pixel information of the target image selected from a plurality of images is smaller than a predetermined value for the discouraging processing;

specifying an image to be used for an album from a plurality of images including the target image of which the selection is discouraged;

determining a score of the target image;

setting a template; and generating layout information based on the image specified by the specifying and on the set template, wherein the discouraging determines a coefficient to discourage selection of the target image in a case where a number of pixels of the target image selected from a plurality of images is smaller than a predetermined value for the discouraging processing, wherein based on the score of the target image and the coefficient, it is specified whether the target image is to be used for the album, and wherein a first coefficient is determined in a case where the pixel information is first pixel information, a second coefficient smaller than the first coefficient is determined in a case where the pixel information is second pixel information indicating a smaller number of pixels than the first pixel information, and a third coefficient smaller than the second coefficient is determined in a case where the pixel information is third pixel information indicating a smaller number of pixels than the second pixel information, wherein the numbers of pixels indicated by the first, second, and third pixel information are smaller than a predetermined value, and wherein the first, second, and third coefficients are smaller than 1.

8. A non-transitory storage medium storing a program for causing an information processing apparatus to execute a control method comprising:

performing discouraging processing to discourage selection of a target image in a case where a number of pixels indicated by pixel information of the target image selected from a plurality of images is smaller than a predetermined value for the discouraging processing;

specifying an image to be used for an album from a plurality of images including the target image of which the selection is discouraged;

determining a score of the target image;

setting a template; and generating layout information based on the image specified by the specifying and on the set template, wherein the discouraging processing determines a coefficient to discourage selection of the target image in a case where a number of pixels of the target image selected from a plurality of images is smaller than a predetermined value for the discouraging processing;

wherein based on the score of the target image and the coefficient, it is specified whether the target image is to be used for the album, and wherein in a case where the number of pixels indicated by the pixel information of the target image is less than or equal to the predetermined value, a value smaller than 1 as the coefficient for the target image is determined, and in a case where the number of pixels indicated by the pixel information of the target image is not less than or equal to the predetermined value, the discouraging processing for determining the coefficient is not executed.

9. A non-transitory storage medium according to claim 8, wherein based on one or more of an object or image quality of the target image, or also based on the pixel information, it is specified whether the target image is to be used for the album.

10. The non-transitory storage medium according to claim 8, further comprising acquiring a creation condition for creating an album, wherein the pixel information of the target image is determined based on the creation condition and a resolution of the target image.

* * * * *